United States Patent
Roy et al.

(10) Patent No.: US 12,433,870 B2
(45) Date of Patent: Oct. 7, 2025

(54) SUPRAMOLECULAR PHOTOPROTECTION OF A PHOTOSENSITIZER

(71) Applicants: Northwestern University, Evanston, IL (US); King Abdulaziz City for Science and Technology (KACST), Riyadh (SA)

(72) Inventors: Indranil Roy, Chicago, IL (US); James Fraser Stoddart, Evanston, IL (US)

(73) Assignees: Northwestern University, Evanston, IL (US); King Abdulaziz City for Science and Technology (KACST), Riyadh (SA)

(*) Notice: Subject to any disclaimer, the term of this patent is extended or adjusted under 35 U.S.C. 154(b) by 1102 days.

(21) Appl. No.: 17/426,633

(22) PCT Filed: Jan. 31, 2020

(86) PCT No.: PCT/US2020/016064
§ 371 (c)(1),
(2) Date: Jul. 29, 2021

(87) PCT Pub. No.: WO2020/160382
PCT Pub. Date: Aug. 6, 2020

(65) Prior Publication Data
US 2022/0133692 A1    May 5, 2022

Related U.S. Application Data

(60) Provisional application No. 62/799,229, filed on Jan. 31, 2019.

(51) Int. Cl.
| | | |
|---|---|---|
| A61K 31/409 | (2006.01) | |
| A61K 41/00 | (2020.01) | |
| A61P 35/00 | (2006.01) | |
| C07D 487/22 | (2006.01) | |

(52) U.S. Cl.
CPC ........ *A61K 31/409* (2013.01); *A61K 41/0057* (2013.01); *A61P 35/00* (2018.01); *C07D 487/22* (2013.01)

(58) Field of Classification Search
CPC ... A61K 31/409; A61K 41/0057; A61P 35/00; C07D 487/22
See application file for complete search history.

(56) References Cited

U.S. PATENT DOCUMENTS

| | | | |
|---|---|---|---|
| 9,290,495 B2 | 3/2016 | Stoddart et al. | |
| 12,084,579 B2* | 9/2024 | Stoddart | C09B 67/009 |
| 2017/0369651 A1 | 12/2017 | Cheng et al. | |

FOREIGN PATENT DOCUMENTS

JP    6180241 B2 *    8/2017

OTHER PUBLICATIONS

Hegge, et al.; "Impact of Curcumin Supersaturation in Antibacterial Photodynamic Therapy-Effect of Cyclodextrin Type and Amount: Studies on Curcumin and Curcuminoides XLV," Journal of Pharmaceutical Sciences, 2012, v101, 1524-1537. (Year: 2012).*
Ryan, et al; "Efficient Host-Guest Energy Transfer in Polycationic Cyclophane-Perylene Diimide Complexes in Water," Journal of the American Chemical Society, 2014, v136: 9053-9060. (Year: 2014).*
Tsuchiya, et al; "Supramolecular Dye Inclusion Single Crystals Created from 2,3,4-Trimethyl-β-cyclodextrin and Porphyrins," Chemistry a European Journal, 2012, v18: 456-465 (Year: 2012).*
Yukruk, et al; "Water-Soluble Green Perylenediimide (PDI) Dyes as Potential Sensitizers for Photodynamic Therapy," Organic Letters, 2005, v7, 2885-2887. (Year: 2005).*
Hegge, et al.; Journal of Pharmaceutical Sciences, v101, pp. 1524-1537 (2012) (Year: 2012).*
Ryan, et al; Journal of the American Chemical Society, v136, pp. 9053-9060 (2014) (Year: 2014).*
Tsuchiya, et al; Chemistry a European Journal, v18, pp. 456-465 (2012) (Year: 2012).*
Yukruk, et al; Organic Letters, v7, pp. 2885-2887 (2005) (Year: 2005).*
Juríček, et al.; Chemical Science, v5, pp. 2724-2731; 2014 (Year: 2014).*
Foreign Patent JP6180241B2_English description and claims (Year: 2017).*
Abrahamse, H., et al. New photosensitizers for photodynamic therapy. Biochem J 473(4), 347-364 (2016).
Ballottari, M., et al. Chlorophyll triplet quenching and photoprotection in the higher plant monomeric antenna protein Lhcb5. J Phys. Chem. B 117, 11337-11348 (2013).
Barnes, J.C., et al. ExBox: A polycyclic aromatic hydrocarbon scavenger. J. Am. Chem. Soc. 135, 183-192 (2013).
Berg, K., et al. Porphyrin-related photosensitizers for cancer imaging and therapeutic applications. J. Microsc. 218, 133-147 (2005).
Cazzaniga, S., et al. Differential roles of carotenes and xanthophylls in photosystem photoprotection. Biochemistry 55, 3636-3649 (2016).
Chen, D.M., et al. Density functional theory investigation of porphyrin diacid: Electronic absorption spectrum and conformational inversion. Chem. Phys. 289, 397-407 (2003).
Chen, L., et al. Supramolecular porphyrin photosensitizers: controllable disguise and photoinduced activation of antibacterial behavior. ACS Appl. Mater. Interfaces 9, 13950-13957 (2017).
Cui, H. et al. Supramolecular medicine. Chem. Soc. Rev. 46, 6430-6432 (2017).
Frances-Soriano, L. Nanohybrid for photodynamic therapy and fluorescence imaging tracking without therapy. Chem. Mater. 30, 3677-3682 (2018).

(Continued)

*Primary Examiner* — Jeffrey S Lundgren
*Assistant Examiner* — W. Justin Youngblood
(74) *Attorney, Agent, or Firm* — Quarles & Brady LLP

(57) ABSTRACT

Disclosed herein are compositions comprising a water-soluble host-guest complex formed from a host receptor and a guest photosensitizer for the photoprotection of the photosensitizer. Also disclosed are methods of using the composition for generating reactive oxygen species, inhibiting the proliferation or killing of a cell, treating a subject with a cell proliferative disease or disorder.

6 Claims, 23 Drawing Sheets

(56) References Cited

OTHER PUBLICATIONS

Freer, A., et al. Pigment-pigment interactions and energy transfer in the antenna complex of the photosynthetic bacterium Rhodopseudomonas acidophila. Science 4, 449-462 (1996).
Fukuzumi, S., et al. Structures and photoinduced electron transfer of protonated complexes of porphyrins and metallophthalocyanines. Coord Chem. Rev. 256, 2488-2502 (2012).
Gust, G., et al. Mimicking photosynthesis. Structure 244, 35-41 (1989).
Hu, Y.B., et al. The endosomal-lysosomal system: From acidification and cargo sorting to neurodegeneration. Transl. Neurodegener. 4, 1-10 (2015).
Jeong, H.G., et al. Design and properties of porphyrin-based singlet oxygen generator. Isr. J Chem. 56, 110-118 (2016).
Li, X., et al. Supramolecular photosensitizers rejuvenate photodynamic therapy. Chem. Soc. Rev. 47, 1174-1188 (2018).
Liu, K., et al. Supramolecular photosensitizers with enhanced antibacterial efficiency. Angew. Chem. Int. Ed. 52, 8285-8289 (2013).
Pascal, A.A., et al. Molecular basis of photoprotection and control of photosynthetic light-harvesting. Nature 436, 134-137 (2005).
Peers, G., et al. An ancient light-harvesting protein is critical for the regulation of algal photosynthesis. Nature 462, 518-521 (2009).
Presselt, M., et al. Quantum chemical insights into the dependence of porphyrin basicity on the meso-aryl substituents: Thermodynamics, buckling, reaction sites and molecular flexibility. Phys. Chem. Chem. Phys. 17, 14096-14106 (2015).
Roy, I., et al. ExTzBox: A glowing cyclophane for live-cell imaging. J. Am. Chem. Soc. 140, 7206-7212 (2018).
Roy, I., et al. A multifunctional subphthalocyanine nanosphere for targeting, labeling, and killing of antibiotic-resistant bacteria. Angew. Chem. Int. Ed. 54, 15152-15155 (2015).
Ruban, A.V. Nonphotochemical chlorophyll fluorescence quenching: mechanism and effectiveness in protecting plants from photodamage. Plant Physiol. 104, 1903-1916 (2016).
Ruban, A.V., et al. Identification of a mechanism of photoprotective energy dissipation in higher plants. Nature 450, 675-578 (2007).
Schmitt, F., et al. Organometallic cages as vehicles for intracellular release of photosensitizers. J. Am. Chem. Soc. 134, 754-757 (2012).
Tokutsu, R., et al. Energy-dissipative supercomplex of photosystem II associated with LHCSR3 in Chlamydomonas reinhardtii. Proc. Natl. Acad. Sci. USA. 110, 10016-10021 (2013).
Wang, J., et al. pH-Dependent assembly of porphyrin-silica nanocomposites and their application in targeted photodynamic therapy. Nano Lett. 17, 6916-6921 (2017).
Wang, X. Q., et al. Cucurbit[8]uril regulated activatable supramolecular photosensitizer for targeted cancer imaging and photodynamic therapy. ACS Appl. Mater. Interfaces 8, 22892-22899 (2016).
Yin, Y.B. DFT study on deprotonation and protonation of porphyrins: How many protons can the porphyrin core take up? Comput. Theor. Chem. 1080, 38-46 (2016).
Young, R.M., et al. Ultrafast conformational dynamics of electron transfer m ExBox4+cPerylene. J. Phys. Chem. A 117, 12438-12448 (2013).
Young, R.M., et al. Ultrafast two-electron transfer in a CdS quantum dot-extended-viologen cyclophane complex. J. Am. Chem. Soc. 138, 6163-6170 (2016).
Ikeda, A. (2013) Water-soluble fullerenes using solubilizing agents, and their applications, Journal of Inclusion, Phenomena and Macrocyclic Chemistry 77, 49-65.
Dale, E. et al. (2016) Supramolecular Explorations: Exhibiting the Extent of Extended Cationic Cyclophanes, Accounts of Chemical Research 49, 262-273.
Roy, I et al. (2019) A Supramolecular Approach for Modulated Photoprotection, Lysosomal Delivery, and Photodynamic Activity of a Photosensitizer, J. Am. Chem. Soc. 141(31), 12296-12304.
International Search Report and Written Opinion for corresponding application PCT/US2020/016064, Jun. 8, 2020 (12 pages).
International Preliminary Report on Patentability for corresponding application No. PCT/US2020/016064, Jul. 27, 2021 (8 pages).

* cited by examiner

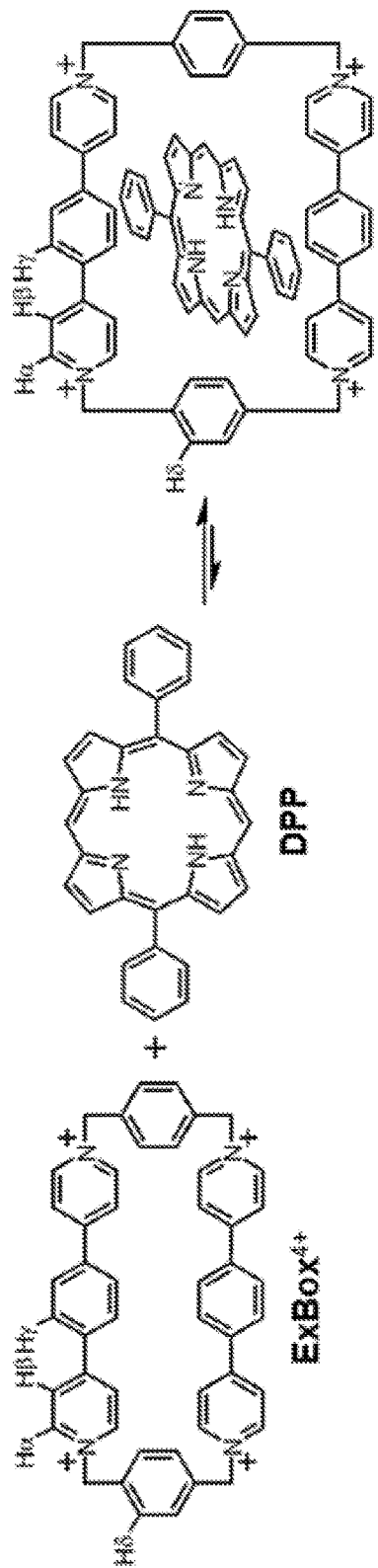
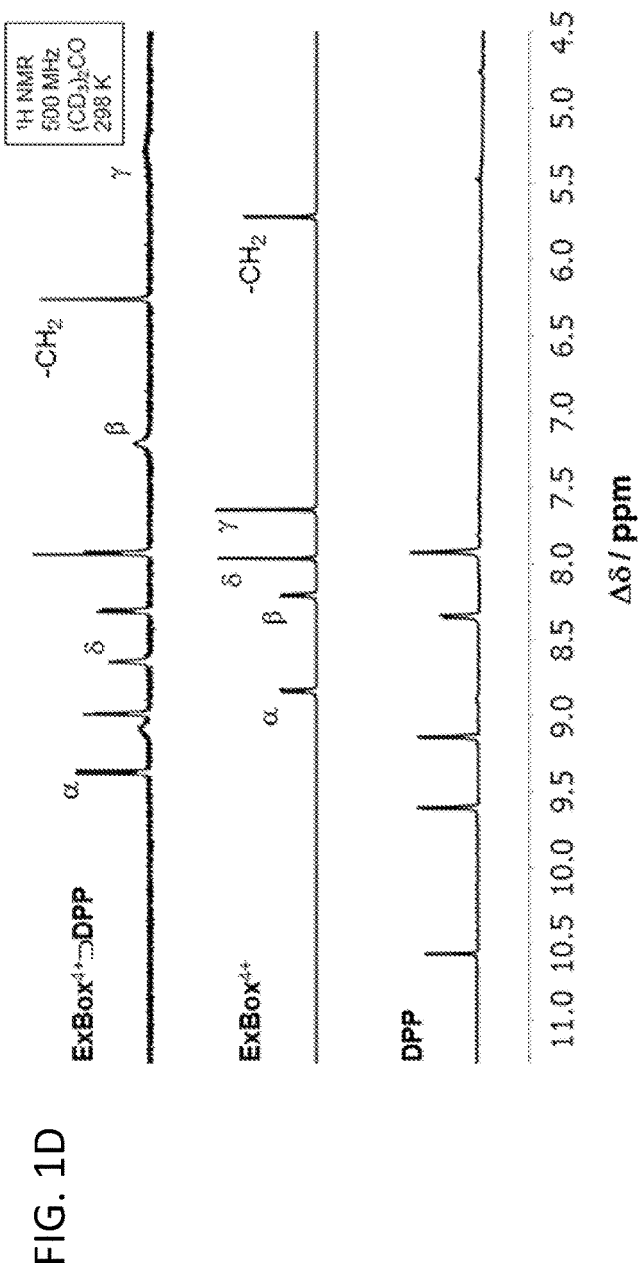
FIG. 1A
FIG. 1D

Side view

Viewed along the a-axis

Viewed along b-axis

Viewed along the c-axis

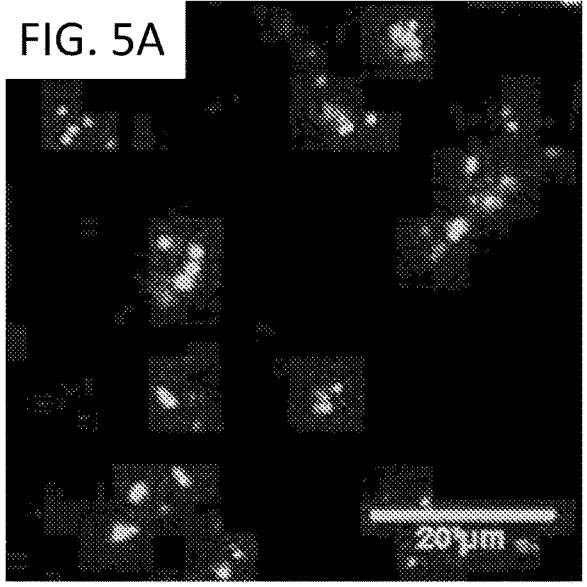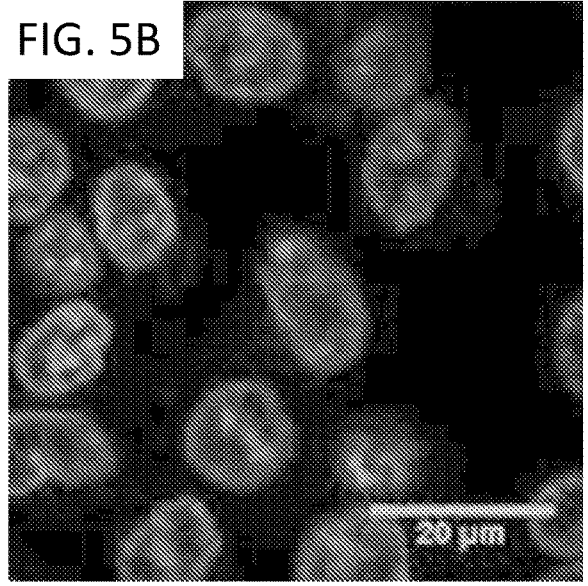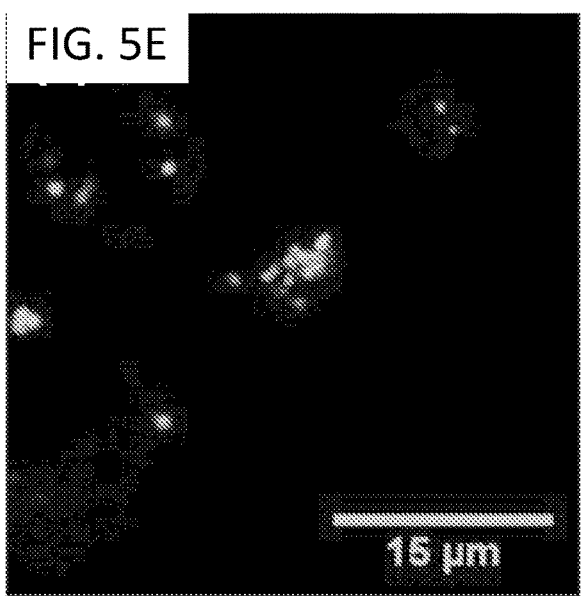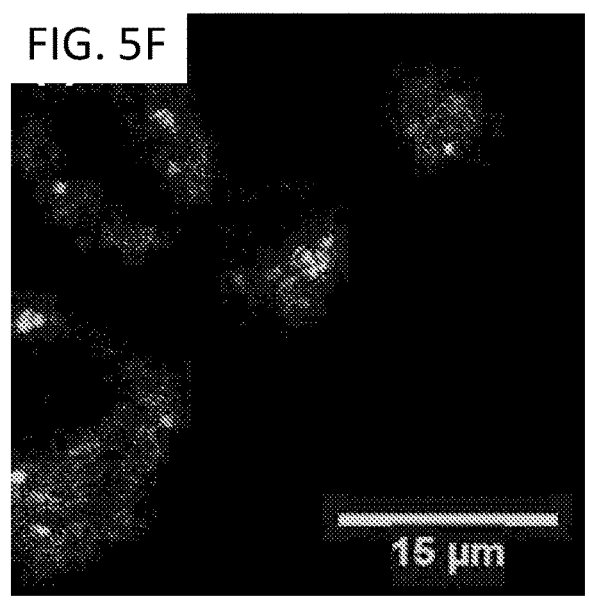

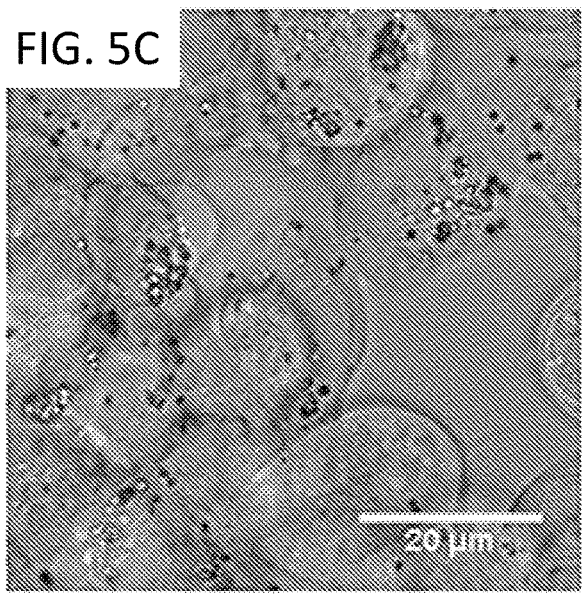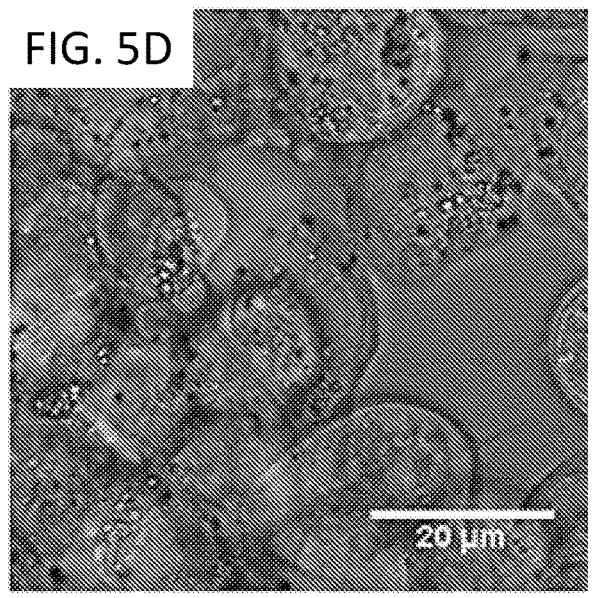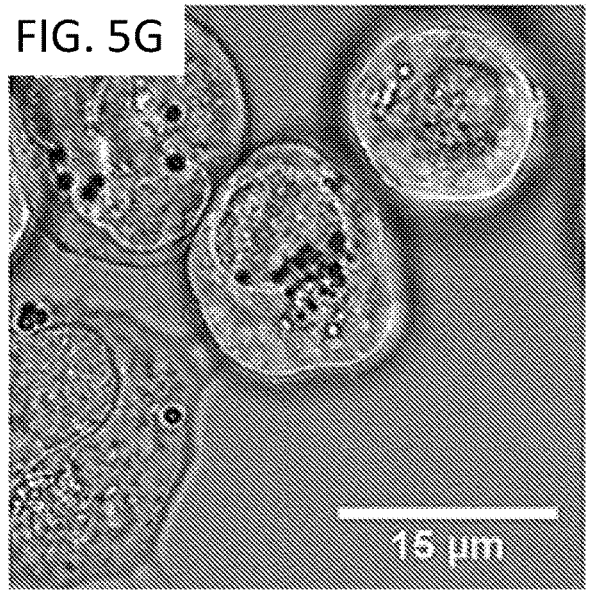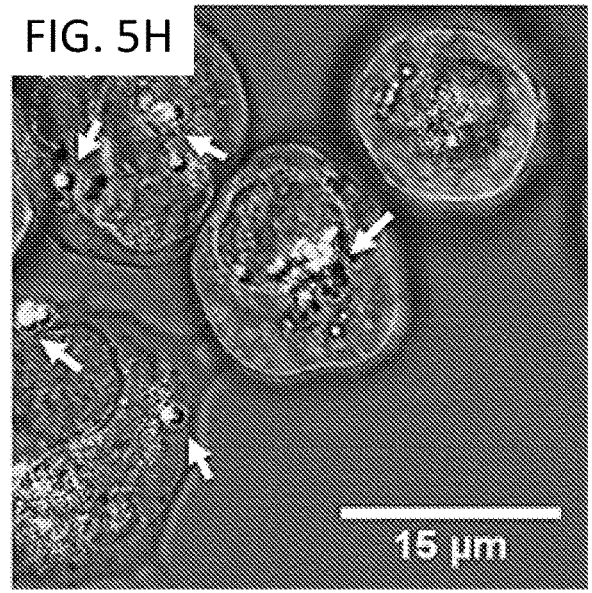

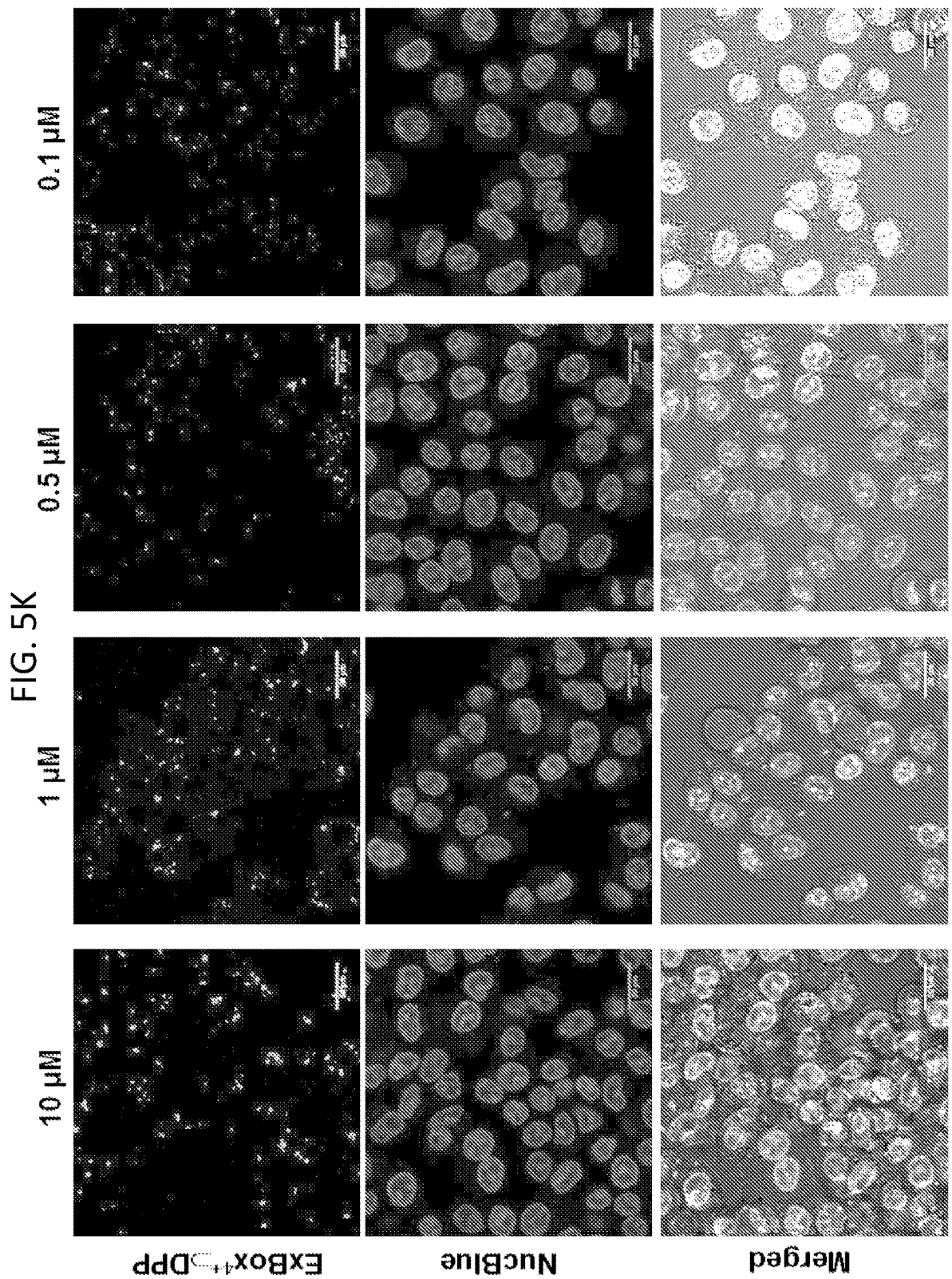

SUPRAMOLECULAR PHOTOPROTECTION OF A PHOTOSENSITIZER

CROSS-REFERENCE TO RELATED APPLICATIONS

This application represents the U.S. National Stage of International Application No. PCT/US2020/016064, filed Jan. 31, 2020, which claims the benefit of priority under 35 U.S.C. § 119(e) to U.S. Provisional Application No. 62/799,229, filed Jan. 31, 2019, the contents of which are incorporated by reference in their entireties.

BACKGROUND

Reactive oxygen species (ROS) are formed as a byproduct of the metabolism of oxygen and has important roles in cell signaling and homeostasis. During a time of environmental stress, ROS levels can increase dramatically, leading to significant damage to cell structures. As a result, organisms have mechanisms for minimizing oxidative damage. For example, light absorption in oxygenic photosynthetic organisms by pigment molecules such as chlorophyll can cause severe oxidative damage, leading to cell death[1]. Harmful long-living chlorophyll triplet states, which formed during the so-called "light" reactions, can readily react with molecular oxygen to yield reactive oxygen species (ROS). Various protective mechanisms[2] operate on the timescale of seconds to minutes in the photosynthetic apparatus to regulate the amount of ROS generation and control the photo-oxidative damage. Pigment binding proteins[3] of higher plants and microalgae play a key role in protecting PSII supercomplexes by excess energy dissipation or non-photochemical quenching (NPQ),[4-6] photosynthetic energy harvesting process[7] via fast electron transfer through electron transport chain along with ROS scavenging[8]. Similar features are seen in photosynthetic bacterial antenna complexes[9], which consist of light-absorbing pigments non-covalently associated with integral proteins. Designing such hosts with a geometrically defined, structurally rigid yet locally flexible cavity made of light energy regulating chemical components, however, is challenging on account of the large size of the π-electron-rich photosensitizers.

BRIEF SUMMARY OF THE INVENTION

Disclosed herein are compositions comprising a water-soluble host-guest complex formed from a host receptor and a guest photosensitizer. In some embodiments, the photosensitizer comprises a macrocyclic pyrrole or a dye. Suitably, the macrocyclic pyrrole is a porphyrin, a chlorin, a bacteriochlorin, a phthalocyanine, a napthalocyanine, or a subphthalocyanine. In some embodiments, the host receptor a cyclophane. Suitably, the cyclophane comprises two extended viologen units and two linker units having an ordered, cyclic arrangement alternating between extended viologen unit and linker unit.

Another aspect of the invention is a crystalline composition comprising any of the water-soluble host-guest complexes formed from the host receptor and the guest photosensitizer described herein.

Another aspect of the invention is a pharmaceutical composition comprising any of the water-soluble host-guest complexes formed from the host receptor and the guest photosensitizer described herein and one or more pharmaceutically acceptable carriers, excipients, or diluents.

Another aspect of the invention comprises a method for the internalization of a photosensitizer into a cell or vesicle. The method may comprise contacting the cell with a composition comprising an effective amount of any of water-soluble host-guest complex formed from the host receptor and the guest photosensitizer described herein for an effective time to internalize the photosensitizer into the cell or the vesicle. In some embodiments, the cell is a cancer cell or a microbial cell or the vesicle is a lysosome.

Another aspect of the invention comprises a method for the controlled release of a photosensitizer from a receptor. The method may comprise providing a composition comprising any of the water-soluble host-guest complex formed from the host receptor and the guest photosensitizer described herein and introducing the host-guest complex into an environment comprising water, wherein the environment has a pH effective in protonating the photosensitizer. In some embodiments, the method further comprising inducing a change in the pH of the environment thereby providing for the environment has having the pH effective in protonating the photosensitizer. Suitably, the environment is a cellular environment inside a cell, an extracellular environment outside a cell, a vesicular environment inside a vesicle, or an extra vesicular environment outside a vesicle. In some embodiments, the method further comprises contacting the cell with an effective amount of the water-soluble host-guest complex for an effective time to internalize the photosensitizer into the cellular environment or the vesicular environment.

Another aspect of the invention comprises a method for generating a reactive oxygen species. The method may comprise providing a composition comprising any of the water-soluble host-guest complexes formed from the host receptor and the guest photosensitizer described herein and irradiating the photosensitizer. In some embodiments, the method further comprises introducing the host-guest complex into an environment comprising water, wherein the environment has a pH effective in protonating the photosensitizer. Suitably, the environment is a cellular environment inside a cell, an extracellular environment outside a cell, a vesicular environment inside a vesicle, or an extra vesicular environment outside a vesicle. In some embodiments, the method further comprises contacting the cell with an effective amount of the water-soluble host-guest complex for an effective time to internalize the photosensitizer into the cellular environment or the vesicular environment. Suitably the reactive oxygen species is generated in the cellular environment inside the cell or the vesicular environment inside the vesicle.

Another aspect of the invention is a method for inhibiting the proliferation of or killing of a cell. The method may comprise providing any of the complexes or compositions comprising the water-soluble host-guest complex formed from the host receptor and the guest photosensitizer, contacting the cell with an effective amount of the water-soluble host-guest complex for an effective time to internalize the photosensitizer into a cellular environment inside the cell; and irradiating the photosensitizer. The method may further comprise further inducing a change in the pH of the cellular environment thereby providing for a pH effective in protonating the photosensitizer. Suitably, the cellular environment has a pH effective in protonating the photosensitizer. Suitably, irradiating the photosensitizer generates a reactive oxygen species.

Another aspect of the invention comprises treating a subject with a cell proliferative disease or disorder. The method may comprise administering an effective amount of any of the complexes or compositions comprising the water-soluble host-guest complex formed from the host receptor and the guest photosensitizer to a subject and irradiating the administered photosensitizer. Suitably, irradiating the photosensitizer generates a reactive oxygen species. In some embodiments, the cell proliferative disease or disorder is a cancer. In other embodiments, the cell proliferative disease or disorder is a microbial infection.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIGS. 1A-1D. FIG. 1A shows a host-guest inclusion complex (ExBox$^{4+}$⊃DPP) formation. FIG. 1B shows a $^1$H NMR titration experiment with DPP in Me$_2$CO-d$_6$. FIG. 1C shows measurement of the binding constant of ($K_a$) for the in/out equilibrium process conducted from 1:1 binding model using the resonances for —CH$_2$ protons assigned with asterisk. FIG. 1D shows an annotated $^1$H NMR spectra (500 MHz, (CD$_3$)$_2$CO, 298 K) of ExBox$^{4+}$⊃DPP, ExBox•4PF$_6$ and DPP FIG. 2A shows a tubular representation showing the distances between the DPP plane and the ExBIPY$^{2+}$ sides and the torsional angles associated with the box-like geometry. FIG. 2B shows a space-filling representation of ExBox$^{4+}$⊃DPP complex. FIG. 2C shows a space-filling representations showing intermolecular π-π interactions between the two ExBIPY$^{2+}$ sides of the neighboring ExBox$^{4+}$⊃DPP complexes. FIG. 2D shows a space-filling representations showing an alternate offset arrangements of the neighboring ExBox$^{4+}$⊃DPP complexes. FIG. 2E shows a space-filling representation of ExBox$^{4+}$⊃DPP super (structure). FIGS. 2F-2H shows a Tubular representations of ExBox$^{4+}$⊃DPP (super)structures viewed along a- (FIG. 2F), b- (FIG. 2G), and c-axis (FIG. 2H), respectively.

FIG. 3A shows a normalized UV-Vis spectra of ExBox$^{4+}$⊃DPP, ExBox$^{4+}$, and DPP (inset: zoomed in spectra showing CT band). FIG. 3B shows a femtosecond TA spectra of ExBox$^{4+}$⊃DPP in H$_2$O excited at $\lambda_{ex}$=414 nm. FIG. 3C shows an evolution-associated spectra (EAS) generated by fitting to an A→B→ground-state kinetic model. State A represents the locally excited $^1$*DPP state with some amount of charge-separated state formed within the instrument response, and state B is the fully charge-separated state.

FIG. 4A shows a fluorescence spectra ($\lambda_{ex}$=414 nm) of ExBox$^{4+}$⊃DPP, and DPP at pH 7 and 4.5 in H$_2$O. FIG. 4B shows a femtosecond TA spectra ($\lambda_{ex}$=414 nm) of ExBox$^{4+}$⊃DPP in H$_2$O at pH 4.5. FIG. 4C shows an evolution-associated spectra (EAS) generated by fitting to a kinetic model for parallel populations decaying via A→B→ground state and C D processes to account for the released protonated DPP. State A represents the locally excited $^1$*DPP state with some amount of charge-separated state formed within the instrument response, and state B is the fully charge-separated state; the other states C and D represent the $^1$*DPP (wavelengths denoted in blue) and $^3$*DPP populations, respectively, of the free DPP in solution. All experiments are performed at 298K. FIG. 4D shows a nanosecond TA (nsTA) spectra of ExBox$^{4+}$⊃DPP in H$_2$O with added HCl excited at $\lambda_{ex}$=414 nm. FIG. 4E shows a biexponential fit to nsTA data at 475 nm. The first time constant represents the intersystem crossing time from the S$_1$ to T$_1$ states, while the second time constant approximates the decay of the triplet state in aerated, room temperature solution. The disagreement with the ~3 ns intersystem crossing time determined with nsTA and the longer time approximated in the fsTA is due to the limited time range of the fsTA measurement and the complexity of the kinetics owing to the heterogeneity of the sample.

FIGS. 5A-5H show live-cell confocal microscopy images of A2780 cells showing Cellular uptake and co-localization of ExBox$^{4+}$⊃DPP. Cells were incubated with (FIG. 5A) ExBox$^{4+}$⊃DPP (10 μM in PBS solution), (FIG. 5B) NucBlue, (FIG. 5C) bright field image of the cells, (FIG. 5D) merged images with red and blue channels. Cells were incubated with (FIG. 5E) ExBox$^{4+}$⊃DPP (10 μM in PBS solution), (FIG. 5F) LysoTracker green, (FIG. 5G) bright field image, and (FIG. 5H) merged images with red and green channel showing the co-localization of ExBox$^{4+}$⊃DPP and LysoTracker green, evidencing the presence of ExBox$^{4+}$⊃DPP in the lysosome of the living cells. Z-stacks of images were deconvolved using ImageJ package. FIG. 5K shows concentration-dependent uptake of ExBox$^{4+}$⊃DPP. Live-cell confocal microscopy images of A2780 cells stained with NucBlue® Live Cell Stain (blue) following incubation with different concentrations (10, 1, 0.5, and 0.1 μM) of ExBox$^{4+}$⊃DPP (red) in PBS for 12 h. Scale bar is 20 μm. (FIG. 5L) Live-cell confocal microscopy images of A2780 cells stained with Lysotracker green and NucBlue showing endolysosomal co-localization of ExBox$^{4+}$⊃DPP after incubation for 1, 2, 6, and 12 h with A2780 cells. White arrows in the merged images demonstrate the co-localization of Lysotracker and ExBox$^{4+}$⊃DPP. Scale bar is 20 μm. (FIG. 5N) Zoomed in image showing clear lysosomal co-localization. (FIG. 5M) Median fluorescence intensity (MFI) of the ExBox$^{4+}$⊃DPP signal measured in A2780 cells using flow cytometry at indicated time points. Results denoted are mean MFI value±SD, n=4. Significance determined by one-way ANOVA and Tukey's multiple comparisons test.

(FIG. 6A) Live-cell confocal images of A2780 cells following incubation with 10 μM PBS solution of ExBox$^{4+}$⊃DPP (red) for 12 h. Images were obtained after 5 min exposure to 630 nm confocal laser with 20% gain (25 mW). White arrows on the merged confocal image showing blebs on the cell surface. Scale bar is 15 μm. (FIG. 6B) A2780 cell viability measured using an MTT assay after treatment with ExBox$^{4+}$⊃DPP (10, 5, 2.5, 1.25, and 0.625 μM) and light irradiation (0.156, 0.078, 0.032, 0.016 J cm$^{-2}$) for 10 min. Error bars represent SD, n=4. (FIG. 6C) Confocal microscopy images of A2780 cells stained with Calcein-AM and Ethidium homodimer-1 after treated with 10 μM PBS solution of ExBox$^{4+}$⊃DPP. Top row and bottom row images represent without (Dark) and with light exposure (Irradiation), respectively. Scale bar is 50 µm.

DETAILED DESCRIPTION OF THE INVENTION

Figure 1B:
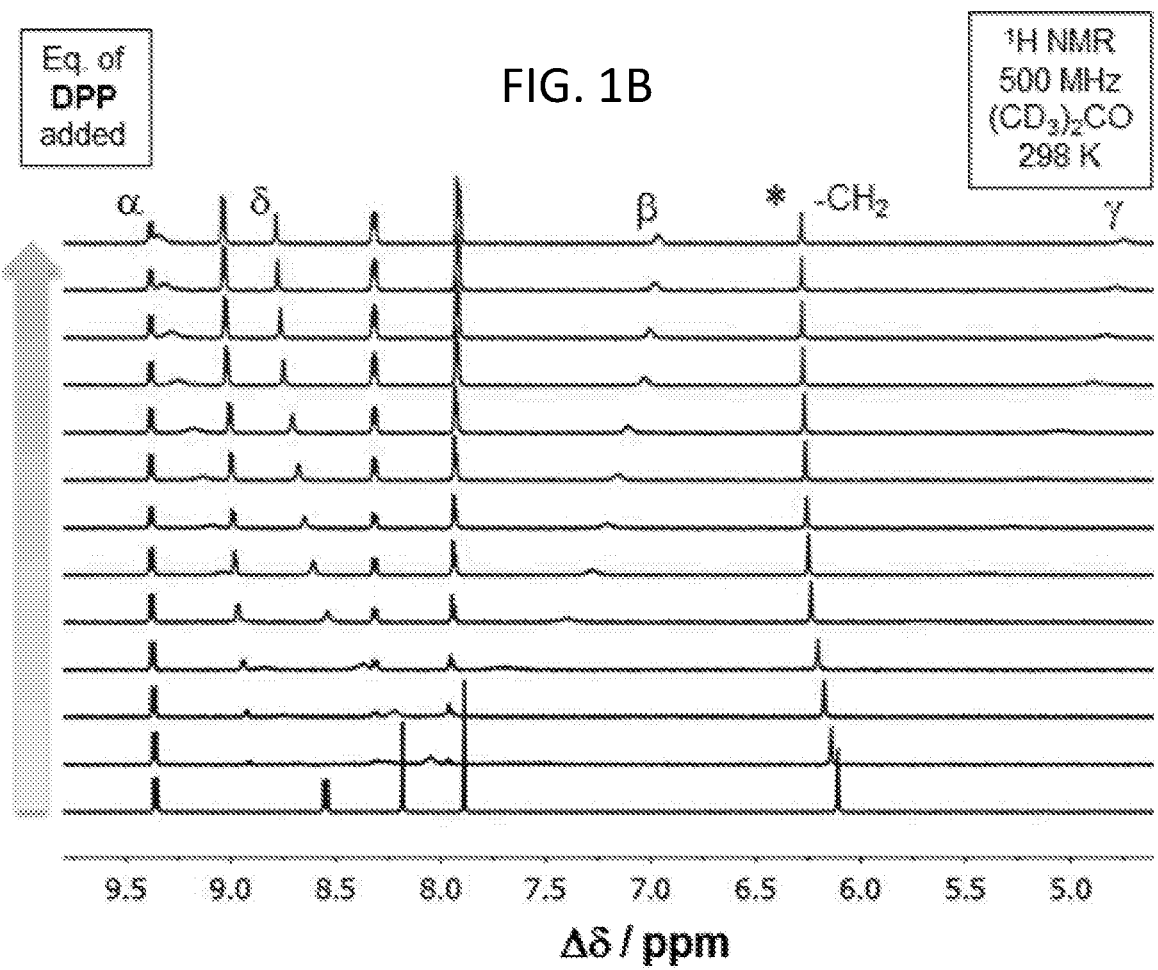

Disclosed herein is a synthetic receptor that binds a photosensitizer to provide photoprotection by regulating the light energy. The synthetic receptor (i) prevents π-π stacking of photosensitizer, (ii) renders photosensitizer soluble in $H_2O$, and (iii) modulates the phototoxicity of the photosensitizer by trapping the photosensitizer in its cavity of the synthetic receptor and releasing it when required. While trapping quenches the photosensitizer triplet state, a pH-dependent release of the photosensitizer recovers its triplet state, thereby activating its ability of reactive oxygen species generation. We employed the receptor-bound photosensitizer complex for the safe delivery of the photosensitizer into the lysosomes of the cancer cells, labeling the cells by utilizing the fluorescence of the released photosensitizer, and used in regulated photodynamic therapy for efficient killing of cancer cells.

Compositions Comprising Host Receptors and Guest Photosensitizer

As used herein, a "receptor" is a geometrically defined, structurally rigid yet locally flexible cavity capable of hosting a π-electron rich photosensitizer. The receptor photoprotects a photosensitizer hosted by the receptor by allowing for an ultrafast energy transfer between the photosensitizer and the receptor. The receptor may also allow for increased solubility of the photosensitizer in aqueous or other media and/or activated release of the photosensitizer.

Suitably the receptor is a cyclophane. A "cyclophane" is a hydrocarbon comprising one or more aromatic units and aliphatic chains bridging the aromatic subunits into a cyclic chemical structure. The cyclophane compositions may comprise two viologen units and two linker units. The units of the cyclophane may comprise an ordered, cyclic arrangement alternating between viologen unit and linker unit. Suitably, these cyclophanes comprise rigid, box-like compositions.

The cyclophane composition may comprise viologen units which are the same or different. The viologen may comprise an extended viologen having a conjugated spacer interposed between two pyridine groups. The spacer may be selected by size to allow for the receptor to host the photosensitizer, by complexing interactions to allow for stable complexation of the host and guest in certain environments and/or promote complex dissociation in other environments, by solubility to allow for the complex comprising the photosensitizer to be soluble in an aqueous solution or other solution, by energy transfer rates between the photosensitizer and the receptor. Suitably the conjugated spacer may be an aromatic spacer or an alkynyl spacer to allow for resonance across the extended viologen. Exemplary conjugated spacers include, without limitation, acetylene, homocyclic aromatic spacers (e.g., a phenyl spacer, a naphthyl spacer, or an anthracene spacer), heterocyclic aromatic spacers (e.g., a thiazolothiazole spacer, a benzobisthiadiazole spacer, a thiophene spacer, a pyrrole spacer). Suitably, the spacer may be selected to allow for the receptor to host a guest photosensitizer. The conjugated spacer may be substituted by one of more substituents.

Suitably the extended viologen comprises an aromatic spacer. As exemplified in the Examples, the extended viologen may comprise one or more phenyls. Ignoring hydrogen or substituents, extended viologens may have a carbon-nitrogen backbone of —$(NC_5)(C_6)_n(C_5N)$—, where n is any suitable integer. In some embodiments, n is 0, 1, 2, 3, or more than 3. The central aryl moiety, i.e., the bridging $C_6$ diradical, may be substituted by one or more substituents at any of the carbon positions where hydrogen may be present. In some embodiments, the extended viologen diradical may be represented by the formula

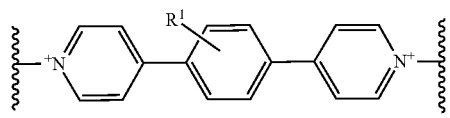

where the substituent $R^1$ may be recognized to be one or more substituents at any of the carbon positions where hydrogen may be present. In certain embodiments, $R^1$ is selected from the group consisting of hydrogen, halogen, a $C_1$-$C_6$ alkyl, hydroxyl, a $C_1$-$C_6$ alkoxyl, amino, a $C_1$-$C_6$ alkylamine, a $C_3$-$C_7$ heterocyclyl, and phenyl moieties. In particular embodiments, $R^1$ is selected from the group consisting of hydrogen, halogen, amino, thiophene, and phenyl moieties. As shown in the Examples below, a cyclophane comprising

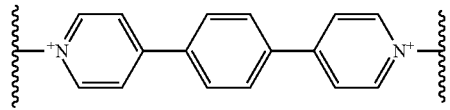 [SMILES: *[n+]1ccc(-c2ccc(-c3cc[n+](*)cc3)cc2)cc1]

is capable of receiving a photosensitizer and photoprotecting the sensitizer.

The cyclophane composition may comprise linkers which are the same or different. Ignoring hydrogen or substituents, linkers may have a carbon backbone of —$(C)_n(C_6)_o(C)_m$—, where n, m, and o are any suitable integer. In some embodiments, n and/or m is 1, 2, 3, or more than 3. In some embodiments, o is 1, 2 or 3. The central aryl moiety, i.e, the bridging $C_6$ diradical, may be substituted by one or more substituents at any of the carbon positions where hydrogen is present. In some embodiments, the linkers may be represented by the formula

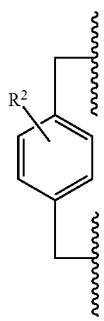

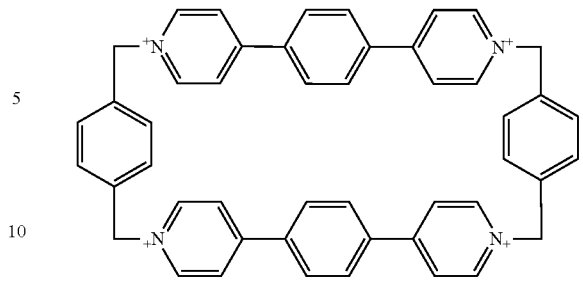

where the substituent $R^2$ may be recognized to be one or more substituents at any of the carbon positions where hydrogen may be present. In certain embodiments, $R^2$ is selected from the group consisting of hydrogen, halogen, a $C_1$-$C_6$ alkyl, hydroxyl, a $C_1$-$C_6$ alkoxyl, amino, a $C_1$-$C_6$ alkylamine, a $C_3$-$C_7$ heterocyclyl, and phenyl moieties. In particular embodiments, $R^2$ is selected from the group consisting of hydrogen, halogen, amino, thiophene, and phenyl moieties.

As shown in the Examples below, a cyclophane comprising

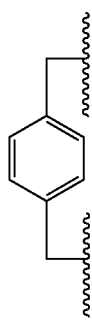

linker and/or

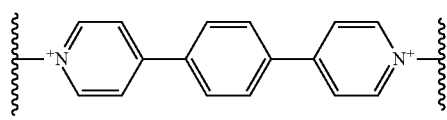 [SMILES: *[n+]1ccc(-c2ccc(-c3cc[n+](*)cc3)cc2)cc1]

aromatic spacer is capable of reversibly receiving and ejecting a photosensitizer, photoprotecting the photosensitizer, and allowing the photosensitizer to be internalized by cells or vesicles.

An exemplary receptor is the tetracationic, box-like cyclophane ExBox[4+], incorporating two extended viologen units (ExBIPY[2+]) linked end-to-end by two p-xylylene linkers. ExBox[4+] can complex with hydrophobic π-electron-rich guests and render them soluble in aqueous media[17].

ExBox[4+] provides a rigid yet locally flexible box-like structure and has the ability to host molecules in its cavity. Furthermore, ExBox[4+] may shield active substrates from the outside environment by enclosing them. Our previous studies showed that ExBox[4+] can function as an electron acceptor in both surface bound[18], and host-guest complexes[19]. The host-guest properties of ExBox[4+] and its ability to accept photoinduced electrons on a picosecond time scale makes it an excellent host for a photosensitizer to provide photoprotection by quenching its excited state. Importantly, ExBox[4+] is biocompatible[20] and stable at low pH conditions and, hence, is a suitable choice as a cellular delivery vehicle.

As used herein, a "photosensitizer" is a molecule that produces a chemical change in another molecule in a photochemical process. Photosensitizers may generate a long-lived triplet excited state and can be used to generate triplet excited states in other organic molecules. Photosensitizers act by absorbing electromagnetic radiation in the ultraviolet, visible or near infrared spectral regions and transferring energy to adjacent molecules via electron transfer or other energy transfer processes. The photosensitizer may comprise a large delocalized π-system. These delocalized π-system may lower the energy of HOMO orbitals, allowing for absorbed light to ionize the molecule. Suitably, photosensitizers may be used for photodynamic therapy, photocatalysis, photopolymerization, photocrosslinking, or photdegradation.

In some embodiments, the photosensitizer comprises one or more pyrroles such as a macrocyclic pyrrole or a dye. Macrocyclic pyrroles, such as tetrapyrroles, are employed commonly as photosensitizers in PDT on account of their ability of efficient ROS generation[21-23]. Dyes, such as bodipy dyes, may comprise a dipyrromethene core structure. Suitably the pyrroles may be reversibily protonated or deprotonated changing the complexing interaction between the host receptor and the guest photosensitizer.

Suitably macrocyclic pyrroles include, without limitation, porphyrins, chlorins, bacteriochlorins, phthalocyanines, napthalocyanines, or subphthalocyanines. For example, the macrocylic pyrroles may be tetrapyrroles such as porphyrins (A), chlorins (B), and bacteriochlorins (C) having a core structure, respectively, of

A

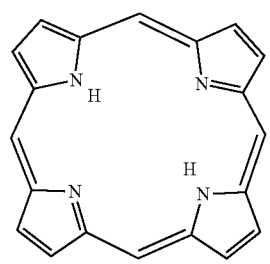

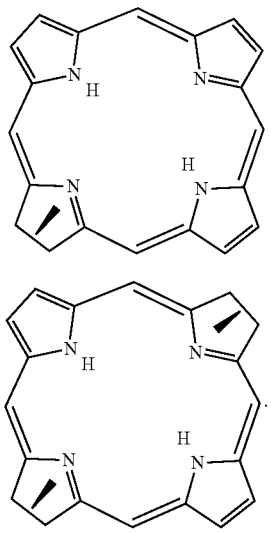

One or more substituents may be attached to the macrocyclic pyrrole core structure.

Macrocyclic pyrroles occur naturally in several important biomolecules, such as heme, chlorophyll, and bacteriochlorophyll. As double bonds are successively reduced (e.g., when moving from porphyrins to chlorins to bacteriochlorins) the Q-band is substantially red-shifted and the height of the band also tends to increase. Typically, tetrapyrrole excitation (with the exception of bacteriochlorins) results predominantly in Type II singlet oxygen whereas other photosensitizers tend to produce Type I ROS, such as hydroxyl radical.

Exemplary photosensitizers include without limitation, photofrin, ALA-induce protoporphryin IX, 5,10,15,20-Tetrakis(1-methylpyridinium-4-yl) porphyrin tosylate, XF70, Foscan, Verteporfin, Chlorin(e6), Monoaspartyl chlorin(e6), HPPH, WST-11, LUZ11, BC19, BC21, Liposomal ZnPC, Chloroaluminium sulfonated phthalocyanine (CASP), Silicon phthalocyanine (PC4), RLP068, and PPD.[31]

Photofrin is an approved photosensitizer for therapy and the present technology has the ability to reduce or eliminate some side effects associated with photosensitizers. Suitably the disclosed technology can reduce the overall sensitization of the patient's body to the photosensitizer through the protection and controlled release mechanism described herein.

As demonstrated in the Examples, the cyclophane ExBox$^{4+}$ has a size-matched cavity suitable for binding a porphyrin, such as t 5,15-diphenylporphyrin or DPP, inside it and forming a water-soluble 1:1 host-guest complex. Furthermore, host-guest complexation does not require additional covalent functionalization of porphyrins to prevent π-π stacking and makes them water-soluble, avoiding the need for tedious synthetic procedures to improve solubility. Porphyrins also undergo protonation (imino nitrogen) in an acidic environment leading to the formation of mono and dicationic species[24-27]. Importantly, protonated DPP (e.g., DPPH$_2^{2+}$) can be released in acidic environments on account of the electrostatic repulsions between the tetracationic ExBox$^{4+}$ and cationic DPP. In the complex, the triplet state of DPP might be bypassed due to photoinduced electron transfer from DPP to ExBox$^{4+}$, leading to the formation of a charge-separated species. At low pH, DPP may be released, which will restore access to the triplet state and activate its ability of ROS generation. Thus, ExBox$^{4+}$ may ensure a safe delivery of DPP into the low pH compartments of living-cells such as lysosomes (pH 4-5), and modulate the anticancer activity of DPP via regulated PDT. Furthermore, the fluorescence of the released DPP may be utilized to track the cellular internalization process.

Pharmaceutical Compositions

The compounds utilized in the methods disclosed herein may be formulated as pharmaceutical compositions that include: (a) a therapeutically effective amount of one or more compounds or complexes as disclosed herein; and (b) one or more pharmaceutically acceptable carriers, excipients, or diluents. The pharmaceutical composition may include the compound or complex in a range of about 0.1 to 2000 mg (preferably about 0.5 to 500 mg, and more preferably about 1 to 100 mg). The pharmaceutical composition may be administered to provide the compound or complex at a daily dose of about 0.1 to 100 mg/kg body weight (preferably about 0.5 to 20 mg/kg body weight, more preferably about 0.1 to 10 mg/kg body weight). In some embodiments, after the pharmaceutical composition is administered to a patient (e.g., after about 1, 2, 3, 4, 5, or 6 hours post-administration), the concentration of the compound or complex at the site of action is about 2 to 10 μM.

The compounds or complexes utilized in the methods disclosed herein may be formulated as a pharmaceutical composition in solid dosage form, although any pharmaceutically acceptable dosage form can be utilized. Exemplary solid dosage forms include, but are not limited to, tablets, capsules, sachets, lozenges, powders, pills, or granules, and the solid dosage form can be, for example, a fast melt dosage form, controlled release dosage form, lyophilized dosage form, delayed release dosage form, extended release dosage form, pulsatile release dosage form, mixed immediate release and, controlled release dosage form, or a combination thereof.

The compounds or complexes utilized in the methods disclosed herein may be formulated as a pharmaceutical composition that includes a carrier. For example, the carrier may be selected from the group consisting of proteins, carbohydrates, sugar, talc, magnesium stearate, cellulose, calcium carbonate, and starch-gelatin paste.

The compounds or complex utilized in the methods disclosed herein may be formulated as a pharmaceutical composition that includes one or more binding agents, filling agents, lubricating agents, suspending agents, sweeteners, flavoring agents, preservatives, buffers, wetting agents, disintegrants, and effervescent agents.

Suitable diluents may include pharmaceutically acceptable inert fillers, such as microcrystalline cellulose, lactose, dibasic calcium phosphate, saccharides, and mixtures of any of the foregoing.

Suitable disintegrants include lightly crosslinked polyvinyl pyrrolidone, corn starch, potato starch, maize starch, and modified starches, croscarmellose sodium, cross-povidone, sodium starch glycolate, and mixtures thereof.

Examples of effervescent agents are effervescent couples such as an organic acid and a carbonate or bicarbonate.

The compounds or complexes utilized in the methods disclosed herein may be formulated as a pharmaceutical composition for delivery via any suitable route. For example, the pharmaceutical composition may be administered via oral, intravenous, intramuscular, subcutaneous, topical, and pulmonary route. Examples of pharmaceutical compositions for oral administration include capsules, syrups, concentrates, powders and, granules.

The compounds or complexes utilized in the methods disclosed herein may be administered in conventional dosage forms prepared by combining the active ingredient with standard pharmaceutical carriers or diluents according to conventional procedures well known in the art. These procedures may involve mixing, granulating and compressing or dissolving the ingredients as appropriate to the desired preparation.

Pharmaceutical compositions comprising the compounds or complexes may be adapted for administration by any appropriate route, for example by the oral (including buccal or sublingual), rectal, nasal, topical (including buccal, sublingual or transdermal), vaginal or parenteral (including subcutaneous, intramuscular, intravenous or intradermal) route.

The compounds or complexes employed in the compositions and methods disclosed herein may be administered as pharmaceutical compositions and, therefore, pharmaceutical compositions incorporating the compounds or complexes are considered to be embodiments of the compositions disclosed herein.

The compounds or complexes for use according to the methods of disclosed herein may be administered as a single compound or complex or a combination of compounds or or complexes. or complex Alternative a compound or complex that treats an infection may be administered as a single compound or complex or in combination with another compound or complex that treats cancer or that has a different pharmacological activity.

As indicated above, pharmaceutically acceptable salts of the compounds are contemplated and also may be utilized in the disclosed methods. The term "pharmaceutically acceptable salt" as used herein, refers to salts of the compounds which are substantially non-toxic to living organisms. Typical pharmaceutically acceptable salts include those salts prepared by reaction of the compounds as disclosed herein with a pharmaceutically acceptable mineral or organic acid or an organic or inorganic base.

The particular counter-ion forming a part of any salt of a compound or complex disclosed herein is may not be critical to the activity of the compound or complex, so long as the salt as a whole is pharmacologically acceptable and as long as the counterion does not contribute undesired qualities to the salt as a whole. Undesired qualities may include undesirably solubility or toxicity.

Photosensitizer Delivery

The photoprotection provided by the receptor allows for the safe delivery of the photosensitizer to a specific location. Suitably the location may be associated with a cell or a vesicle. The cell may be capable of internalizing the host-guest complex comprising the photosensitizer and the receptor such as through an endocytic process. The photosensitizer may in present within the cell for a time sufficient to interact with electromagnetic radiation. In other embodiments, however, the photosensitizer may be compartmentalized within a vesicle, such as a lysosome, prior to interaction with electromagnetic radiation.

Methods for internalization of a photosensitizer into a cell or a vesicle may comprise contacting the cell with any of the complexes or compositions described herein with an effective amount of the host-guest complex formed from the host receptor and the guest photosensitizer for an effective time to internalize the photosensitizer into the cell or vesicle. As used herein, an "effective amount" is an amount of the complex or photosensitizer capable of being detected within the cell or vesicle. The photosensitizer may be detected by any suitable method, including microscopy methods such as demonstrated in the Examples. As used herein, an "effective time" is a time sufficient for the complex or photosensitizer to be detected within the cell or vesicle.

Suitably the cell is a cell associated with a cell proliferative disease or disorder such as a cancer or a microbial infection. Suitably the cancer may be a breast cancer including metastatic breast cancer, ovarian, multiple myeloma, leukemia, non-small cell lung cancer, colon cancer, cancer of the central nervous system, melanoma, o renal cancer, prostate cancer, and cervical cancer). Suitably the microbial infection may be a bacterial or fungal infection. In some embodiments, the bacterial infection is a Gram-negative or Gram-positive bacterial infection. Advantageously, microorganisms such as bacteria will not develop resistance to PDT and, as a result, is suitable for treating antibiotic resistant infections.

Suitably the vesicle is any membrane-bound body such as a lysosome.

Although cells and vesicles may be capable of internalizing the photosensitizer and/or host-guest complex, in some embodiments the photosensitizer and/or host-guest complex is associated with the cell or vesicle outside the cell or vesicle, respectively.

Method of Controlled Release of Photosensitizers from Receptors

The protonation state of the photosensitizer may be used for the controlled release of photosensitizers from the receptor. Suitably the receptor may comprise a cationic charge such as the 4+ cationic charge of ExBox$^{4+}$. Protonating or oxidizing the photosensitizer may result in the photosensitizer possessing a cationic charge or a more positive charge. When protonating or oxidizing the photosensitizer results in a cationic charge, electrostatic repulsion may lower the dissociation energy of the photosensitizer from the receptor and/or result in spontaneous dissociation. Even in the situation where the photosensitizer possesses a more positive charge, protonation or oxidation may result in a lower dissociation energy. Controlling the protonation or oxidation state will, therefore, control the release of the photosensitizer.

Suitably a method of the controlled release of a photosensitizer from a receptor comprises providing any of the compositions described herein comprising the water-soluble host-guest complex formed from the host receptor and the guest photosensitizer and introducing the host-guest complex into an environment comprising water. When the environment has a pH effective in protonating the photosensitizer may thereby be released from the receptor. The method may further comprise inducing a change in the pH of the environment thereby providing for the environment has the pH effective in protonating the photosensitizer. As used herein, a "pH effective in protonating the photosensitizer" means a pH where the equilibrium concentration of protonated photosensitizers is greater than at 8.0 pH. Suitably the pH effective in protonating the photosensitizer is an acidic pH, including a pH less than 7.0, 6.5, 6.0, 5.5, 5.0, 4.5, or 4.0.

Suitably the environment is a cellular environment or a vesicular environment. The cellular environment may be an intracellular environment inside a cell or an extracellular environment outside a cell. The cellular environment may also be an intravesicular environment inside a vesicle or an extravesicular environment outside a vesicle. The method may further comprise contacting the cell with an effective amount of the water-soluble host-guest complex for an effective time to internalize the photosensitizer into the cellular environment or the vesicular environment.

Suitably the cell may be any of the cells described herein such as is a cancer cell or a microbial cell. Suitably the vesicle may be any of the vesicles described herein such as a lysosome.

Methods of Generating Reactive Oxygen Species

The photosensitizer may be used to generate ROS. "Reactive oxygen species" or "ROS" are reactive species that comprise oxygen, including, without limitation, hydroxyl radical (OH$^\bullet$), peroxide ($H_2O_2$), superoxide ($O_2^-$), and singlet oxygen ($^1O_2$). The receptor photoprotects the photosensitizer, thereby minimizing the generation of ROS when the photosensitizer is irradiated with electromagnetic radiation. When the receptor and photosensitizer are dissociated, and the receptor cannot photoprotect the photosensitizer, generation of ROS when the photosensitizer is irradiated should increase.

The method for the generation of a ROS may comprise providing any of the complexes or compositions described herein comprising the water-soluble host-guest complex formed from the host receptor and the guest photosensitizer and irradiating the photosensitizer. The photosensitizer may be irradiated with electromagnetic radiation in the ultraviolet or visible spectrum. The method may further comprise inducing a change in the pH of the environment thereby providing for the environment has the pH effective in protonating the photosensitizer. Suitably, the environment may be a cellular environment inside a cell, an extracellular environment outside a cell, a vesicular environment inside a vesicle, or an extra vesicular environment outside a vesicle. The method may also comprise contacting the cell with an effective amount of the water-soluble host-guest complex for an effective time to internalize the photosensitizer into the cellular environment or the vesicular environment.

Methods of Treatment

As used herein, the terms "treating" or "to treat" each mean to alleviate symptoms, eliminate the causation of resultant symptoms either on a temporary or permanent basis, and/or to prevent or slow the appearance or to reverse the progression or severity of resultant symptoms of the named disease or disorder. As such, the methods disclosed herein encompass both therapeutic and prophylactic administration.

As used herein, a "subject" may be interchangeable with "patient" or "individual" and means an animal, which may be a human or non-human animal, in need of treatment. A "subject in need of treatment" may include a subject having a disease, disorder, or condition that is responsive to therapy with the compositions disclosed herein. For example, a "subject in need of treatment" may include a subject having a cell proliferative disease, disorder, or condition such as cancer (e.g., cancers such as multiple myeloma, leukemia, non-small cell lung cancer, colon cancer, cancer of the central nervous system, melanoma, ovarian cancer, renal cancer, prostate cancer, breast cancer including metastatic breast cancer, and cervical cancer) or a microbial infection (e.g., a bacterial infection, including a Gram-positive bacterial infection or a Gram-negative bacterial infection, or a viral infection).

As used herein the term "effective amount" refers to the amount or dose of the complex, composition, or electromagnetic radiation, upon single or multiple dose administration to the subject, which provides the desired effect in the subject under diagnosis or treatment. The disclosed methods may include administering an effective amount of the disclosed complexes or compositions (e.g., as present in a pharmaceutical composition) for treating a cell proliferative disease or disorder.

An effective amount can be readily determined by the attending diagnostician, as one skilled in the art, by the use of known techniques and by observing results obtained under analogous circumstances. In determining the effective amount or dose of compound administered, a number of factors can be considered by the attending diagnostician, such as: the species of the subject; its size, age, and general health; the degree of involvement or the severity of the disease or disorder involved; the response of the individual subject; the particular compound administered; the mode of administration; the bioavailability characteristics of the preparation administered; the dose regimen selected; the use of concomitant medication; and other relevant circumstances.

A typical daily dose may contain from about 0.01 mg/kg to about 100 mg/kg (such as from about 0.05 mg/kg to about 50 mg/kg and/or from about 0.1 mg/kg to about 25 mg/kg) of each compound used in the present method of treatment.

Compositions can be formulated in a unit dosage form, each dosage containing from about 1 to about 500 mg of each compound individually or in a single unit dosage form, such as from about 5 to about 300 mg, from about 10 to about 100 mg, and/or about 25 mg. The term "unit dosage form" refers to a physically discrete unit suitable as unitary dosages for a patient, each unit containing a predetermined quantity of active material calculated to produce the desired therapeutic effect, in association with a suitable pharmaceutical carrier, diluent, or excipient.

As used herein, "photodynamic therapy" or "PDT" is a therapeutic mechanism where a photosensitizer in its triplet excited state is capable of reacting with molecular oxygen via electron transfer or another energy transfer process to generate reactive oxygen species. ROS generated via PDT may interact with cells or cell membrane causing apoptosis or necrosis. As a result, PDT may be used for inhibiting the proliferation of or killing cells, such as cancer cells or microorganisms, or for treating a subject with a cell proliferative disease or disorder, such as cancer or a microbial infection.

Suitably methods for the inhibition of proliferation or killing of a cell may comprise providing any of the complexes or compositions described herein comprising the water-soluble host-guest complex formed from the host receptor and the guest photosensitizer; contacting the cell with an effective amount of the water-soluble host-guest complex for an effective time to internalize the photosensitizer into a cellular environment inside the cell; and irradiating the photosensitizer. Suitably, the cellular environment has a pH effective in protonating the photosensitizer. The photosensitizer may be irradiated with an effective amount of electromagnetic radiation in the ultraviolet or visible spectrum.

Suitably methods of treating a subject with a cell proliferative disease or disorder may comprise administering an effective amount of any of the compositions described herein comprising the water-soluble host-guest complex formed from the host receptor and the guest photosensitizer to a subject and irradiating the administered photosensitizer. The cell proliferative disease or disorder is a cancer or a microbial infection. The photosensitizer may irradiated with an effective amount of electromagnetic radiation in the ultraviolet or visible spectrum.

Definitions

As used herein, an asterick "*" or a plus sign "+" may be used to designate the point of attachment for any radical group or substituent group.

The term "alkyl" as contemplated herein includes a straight-chain or branched alkyl radical in all of its isomeric forms, such as a straight or branched group of 1-12, 1-10, or 1-6 carbon atoms, referred to herein as $C_1$-$C_{12}$ alkyl, $C_1$-$C_{10}$-alkyl, and $C_1$-$C_6$-alkyl, respectively.

The term "alkylene" refers to a diradical of an alkyl group. An exemplary alkylene group is —$CH_2CH_2$—.

The term "haloalkyl" refers to an alkyl group that is substituted with at least one halogen. For example, —$CH_2F$, —$CHF_2$, —$CF_3$, —$CH_2CF_3$, —$CF_2CF_3$, and the like The term "heteroalkyl" as used herein refers to an "alkyl" group in which at least one carbon atom has been replaced with a heteroatom (e.g., an O, N, or S atom). One type of heteroalkyl group is an "alkoxyl" group The term "alkenyl" as used herein refers to an unsaturated straight or branched hydrocarbon having at least one carbon-carbon double bond, such as a straight or branched group of 2-12, 2-10, or 2-6 carbon atoms, referred to herein as $C_2$-$C_{12}$-alkenyl, $C_2$-$C_{10}$-alkenyl, and $C_2$-$C_6$-alkenyl, respectively The term "alkynyl" as used herein refers to an unsaturated straight or branched hydrocarbon having at least one carbon-carbon triple bond, such as a straight or branched group of 2-12, 2-10, or 2-6 carbon atoms, referred to herein as $C_2$-$C_{12}$-alkynyl, $C_2$-$C_{10}$-alkynyl, and $C_2$-$C_6$-alkynyl, respectively The term "cycloalkyl" refers to a monovalent saturated cyclic, bicyclic, or bridged cyclic (e.g., adamantyl) hydrocarbon group of 3-12, 3-8, 4-8, or 4-6 carbons, referred to herein, e.g., as "$C_{4-8}$-cycloalkyl," derived from a cycloalkane. Unless specified otherwise, cycloalkyl groups are optionally substituted at one or more ring positions with, for example, alkanoyl, alkoxy, alkyl, haloalkyl, alkenyl, alkynyl, amido, amidino, amino, aryl, arylalkyl, azido, carbamate, carbonate, carboxy, cyano, cycloalkyl, ester, ether, formyl, halogen, haloalkyl, heteroaryl, heterocyclyl, hydroxyl, imino, ketone, nitro, phosphate, phosphonato, phosphinato, sulfate, sulfide, sulfonamido, sulfonyl or thiocarbonyl. In certain embodiments, the cycloalkyl group is not substituted, i.e., it is unsubstituted.

The term "cycloalkylene" refers to a diradical of a cycloalkyl group.

The term "partially unsaturated carbocyclyl" refers to a monovalent cyclic hydrocarbon that contains at least one double bond between ring atoms where at least one ring of the carbocyclyl is not aromatic. The partially unsaturated carbocyclyl may be characterized according to the number oring carbon atoms. For example, the partially unsaturated carbocyclyl may contain 5-14, 5-12, 5-8, or 5-6 ring carbon atoms, and accordingly be referred to as a 5-14, 5-12, 5-8, or 5-6 membered partially unsaturated carbocyclyl, respectively. The partially unsaturated carbocyclyl may be in the form of a monocyclic carbocycle, bicyclic carbocycle, tricyclic carbocycle, bridged carbocycle, spirocyclic carbocycle, or other carbocyclic ring system. Exemplary partially unsaturated carbocyclyl groups include cycloalkenyl groups and bicyclic carbocyclyl groups that are partially unsaturated. Unless specified otherwise, partially unsaturated carbocyclyl groups are optionally substituted at one or more ring positions with, for example, alkanoyl, alkoxy, alkyl, haloalkyl, alkenyl, alkynyl, amido, amidino, amino, aryl, arylalkyl, azido, carbamate, carbonate, carboxy, cyano, cycloalkyl, ester, ether, formyl, halogen, haloalkyl, heteroaryl, heterocyclyl, hydroxyl, imino, ketone, nitro, phosphate, phosphonato, phosphinato, sulfate, sulfide, sulfona-mido, sulfonyl or thiocarbonyl. In certain embodiments, the partially unsaturated carbocyclyl is not substituted, i.e., it is unsubstituted.

The term "aryl" is art-recognized and refers to a carbocyclic aromatic group. Representative aryl groups include phenyl, naphthyl, anthracenyl, and the like. The term "aryl" includes polycyclic ring systems having two or more carbocyclic rings in which two or more carbons are common to two adjoining rings (the rings are "fused rings") wherein at least one of the rings is aromatic and, e.g., the other ring(s) may be cycloalkyls, cycloalkenyls, cycloalkynyls, and/or aryls. Unless specified otherwise, the aromatic ring may be substituted at one or more ring positions with, for example, halogen, azide, alkyl, aralkyl, alkenyl, alkynyl, cycloalkyl, hydroxyl, alkoxyl, amino, nitro, sulfhydryl, imino, amido, carboxylic acid, —C(O)alkyl, —$CO_2$alkyl, carbonyl, carboxyl, alkylthio, sulfonyl, sulfonamido, sulfonamide, ketone, aldehyde, ester, heterocyclyl, aryl or heteroaryl moieties, —$CF_3$, —CN, or the like. In certain embodiments, the aromatic ring is substituted at one or more ring positions with halogen, alkyl, hydroxyl, or alkoxyl. In certain other embodiments, the aromatic ring is not substituted, i.e., it is unsubstituted. In certain embodiments, the aryl group is a 6-10 membered ring structure.

The terms "heterocyclyl" and "heterocyclic group" are art-recognized and refer to saturated, partially unsaturated, or aromatic 3- to 10-membered ring structures, alternatively 3-t,o 7-membered rings, whose ring structures include one to four heteroatoms, such as nitrogen, oxygen, and sulfur. The number of ring atoms in the heterocyclyl group can be specified using 5 Cx-Cx nomenclature where x is an integer specifying the number of ring atoms. For example, a $C_3$-$C_7$ heterocyclyl group refers to a saturated or partially unsaturated 3- to 7-membered ring structure containing one to four heteroatoms, such as nitrogen, oxygen, and sulfur. The designation "$C_3$-$C_7$" indicates that the heterocyclic ring contains a total of from 3 to 7 ring atoms, inclusive of any heteroatoms that occupy a ring atom position.

The terms "amine" and "amino" are art-recognized and refer to both unsubstituted and substituted amines, wherein substituents may include, for example, alkyl, cycloalkyl, heterocyclyl, alkenyl, and aryl.

The terms "alkoxyl" or "alkoxy" are art-recognized and refer to an alkyl group, as defined above, having an oxygen radical attached thereto. Representative alkoxyl groups include methoxy, ethoxy, tert-butoxy and the like.

An "ether" is two hydrocarbons covalently linked by an oxygen. Accordingly, the substituent of an alkyl that renders that alkyl an ether is or resembles an alkoxyl, such as may be represented by one of —O-alkyl, —O-alkenyl, —O-alkynyl, and the like.

An "epoxide" is a cyclic ether with a three-atom ring typically include two carbon atoms and whose shape approximates an isosceles triangle. Epoxides can be formed by oxidation of a double bound where the carbon atoms of the double bond form an epoxide with an oxygen atom.

The term "carbonyl" as used herein refers to the radical —C(O)—.

The term "carboxamido" as used herein refers to the radical —C(O)NRR', where R and R' may be the same or different. Rand R' may be independently alkyl, aryl, arylalkyl, cycloalkyl, formyl, haloalkyl, heteroaryl, or heterocyclyl.

The term "carboxy" as used herein refers to the radical —COOH or its corresponding salts, e.g. —COONa, etc.

The term "amide" or "amido" as used herein refers to a radical of the form —$R^1C(O)N(R^2)$—, —$R^1C(O)N(R^2)$ $R^3$—, —$C(O)NR^2R^3$, or —$C(O)NH_2$, wherein $R^1$, $R^2$ and $R^3$ are each independently alkoxy, alkyl, alkenyl, alkynyl, amide, amino, aryl, arylalkyl, carbamate, cycloalkyl, ester, ether, formyl, halogen, haloalkyl, heteroaryl, heterocyclyl, hydrogen, hydroxyl, ketone, or nitro.

The compounds of the disclosure may contain one or more chiral centers and/or double bonds and, therefore, exist as stereoisomers, such as geometric isomers, enantiomers or diastereomers. The term "stereoisomers" when used herein consist of all geometric isomers, enantiomers or diastereomers. These compounds may be designated by the symbols "R" or "S," depending on the configuration of substituents around the stereogenic carbon atom. The present invention encompasses various stereo isomers of these compounds and mixtures thereof. Stereoisomers include enantiomers and diastereomers. Mixtures of enantiomers or diastereomers may be designated "(±)" in nomenclature, but the skilled artisan will recognize that a structure may denote a chiral center implicitly. It is understood that graphical depictions of chemical structures, e.g., generic chemical structures, encompass all stereoisomeric forms of the specified compounds, unless indicated otherwise. Compositions comprising substantially purified stereoisomers, epimers, or enantiomers, or analogs or derivatives thereof are contemplated herein (e.g., a composition comprising at least about 90%, 95%, or 99% pure stereoisomer, epimer, or enantiomer.)

Miscellaneous

Unless otherwise specified or indicated by context, the terms "a", "an", and "the" mean "one or more." For example, "a molecule" should be interpreted to mean "one or more molecules."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion of additional components other than the components recited in the claims. The term "consisting essentially of" should be interpreted to be partially closed and allowing the inclusion only of additional components that do not fundamentally alter the nature of the claimed subject matter.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

EXAMPLES

We demonstrate in the Examples a photoprotective mechanism in the supramolecular complex ExBox$^{4+}$⊃DPP, synthesized by trapping a hydrophobic guest DPP into the cavity of a tetracationic host receptor ExBox$^{4+}$. The hydrophilic ExBox$^{4+}$ prevents π-π stacking of the DPP, renders it soluble in H$_2$O, and modulates the phototoxicity of DPP. Whereas trapping leads to the quenching of DPP triplet state by picosecond electron transfer to provide photoprotection, a pH-dependent release of DPP recovers its triplet state and thereby activates its ability of reactive oxygen species (ROS) generation in oxygenic conditions. Furthermore, ExBox$^{4+}$⊃DPP treatment of cells did not show cytotoxicity in the dark, even with a loading concentration as high as 100 μM. Confocal microscopy revealed that ExBox$^{4+}$⊃DPP is taken up by lysosomes of cancer cells, where DPP gets protonated in the acidic environment, leading to its release. This cellular internalization process was monitored by utilizing the fluorescence of released DPP at a broad range of concentrations (0.1-10 μM). In vitro investigations revealed that upon irradiation with visible light, DPP generates 20 times more ROS inside cancer cells compared to in the dark and kills them efficiently in a single treatment within 10 min, even with a dose as low as 0.078 J cm$^{-2}$ and a loading concentration of 10 μM. The ability of multifunctional synthetic receptor ExBox$^{4+}$ in photoprotection, efficient lysosomal delivery, and pH triggered release of a photosensitizer facilitates the use of ExBox$^{4+}$⊃DPP in anticancer therapy via regulated photodynamic therapy (PDT). This approach is useful in supramolecular medicine for developing pharmaceutical formulations of photosensitive drugs, enhancement of drugs photostability and regulating their therapeutic activity.

Figure 1C:
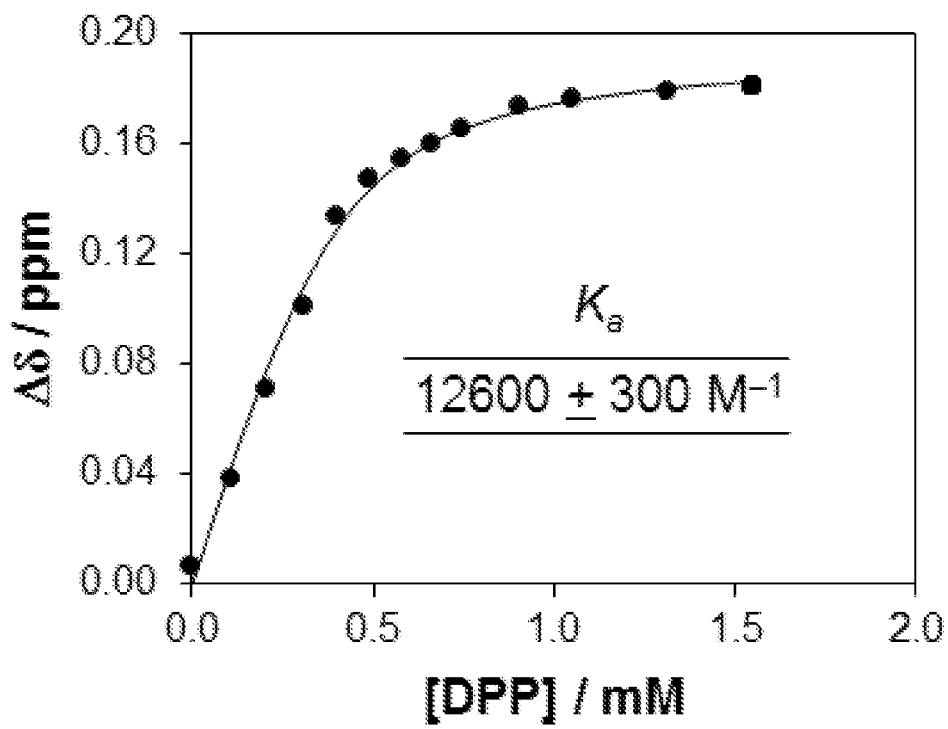

The synthesis of ExBox•4Cl was carried out following our previously reported procedure[17]. Solid DPP (0.46 mg, 1 mmol) was dissolved in Me$_2$CO (1 mM, 1 mL) and added to a solution of ExBox•4Cl in H$_2$O (1.0 mM, 1 mL). The mixture was sonicated for 15 min, Me$_2$CO was removed in vacuum, and the H$_2$O portion was passed through a 0.45-μm filter to yield 1:1 ExBox$^{4+}$⊃DPP complex (FIG. 1A) in water. Upon complex formation, the aqueous solution color changed to light orange-pink or tangerine. The 41 NMR spectrum (FIGS. 1B and 1D) of ExBox$^{4+}$⊃DPP in (CD$_3$)$_2$C$_O$ displayed significant upfield chemical shifts of the resonances for the β and γ protons of ExBox$^{4+}$ and all the signals for the DPP protons. Small downfield shifts were observed for the signals from the bridged phenylene protons of ExBox$^{4+}$. The resonances for the α and CH$_2$ protons of ExBox$^{4+}$ were affected only slightly by the shielding effect of DPP as they are located at the corners and display only slight shifts in their 41 NMR spectra. This pattern is in excellent agreement with the inclusion of DPP inside ExBox$^{4+}$ in solution. Importantly, only one set of proton signals was observed for both ExBox$^{4+}$ and DPP, likely as a result of the various species that exist in equilibrium undergoing fast exchange on the 41 NMR time-scale. The association constant ($K_a$) obtained from 1:1 binding model was calculated to be 12600±300 M$^{-1}$ from the chemical shifts of 41 NMR titrations experiments (FIG. 1B-1C) between ExBox$^{4+}$ and DPP in (CD$_3$)$_2$CO.

Figure 2A:
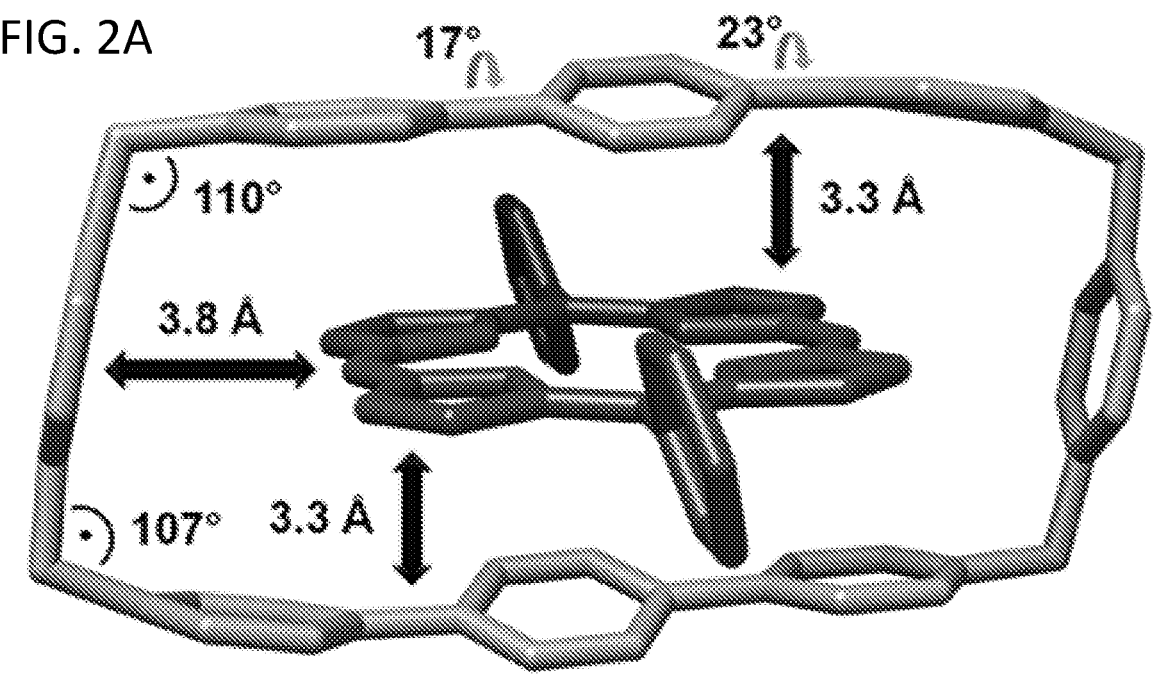
FIGS. 2A-2H show solid-state (super)structures of ExBox$^{4+}$⊃DPP deduced from single-crystal X-ray crystallography.
Figure 2B:
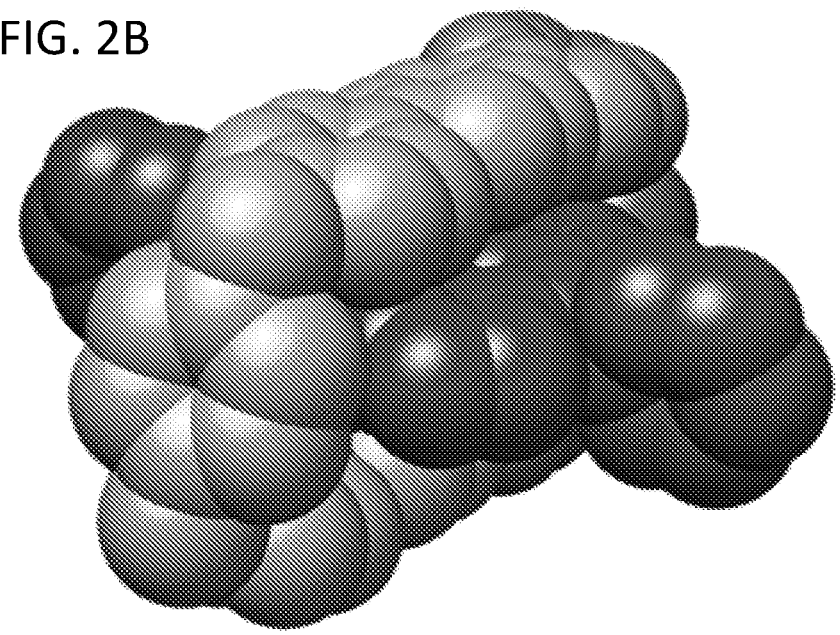
Figure 2C:
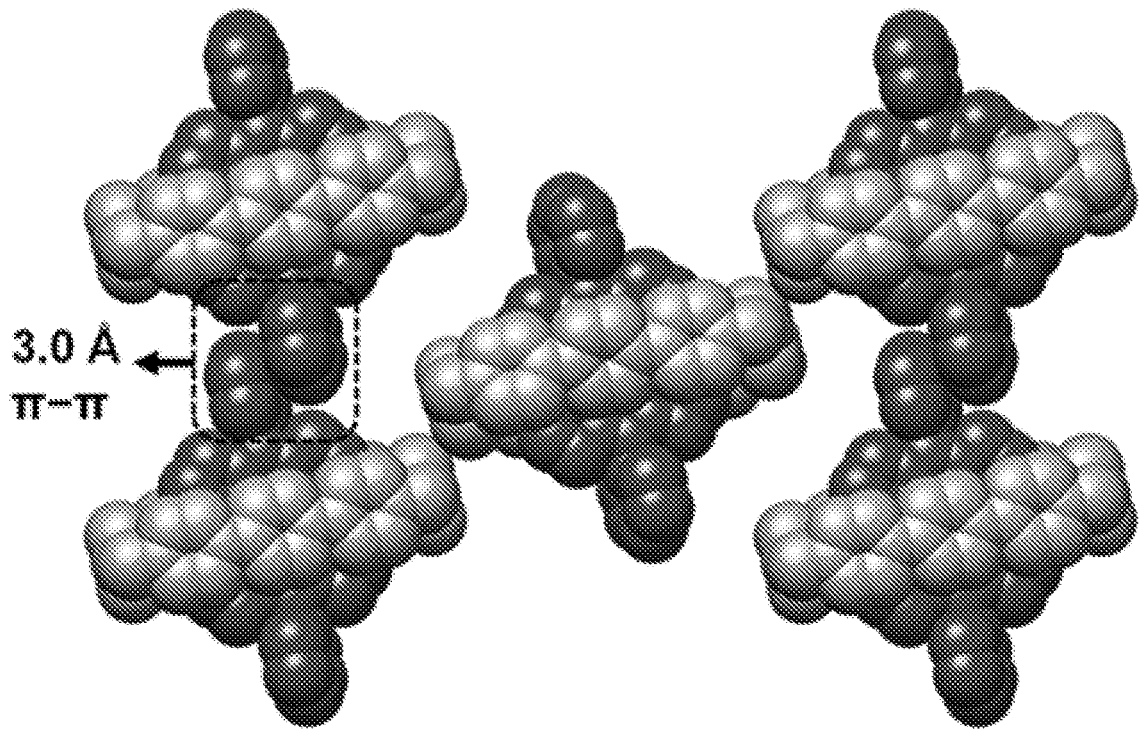
Figure 2D:
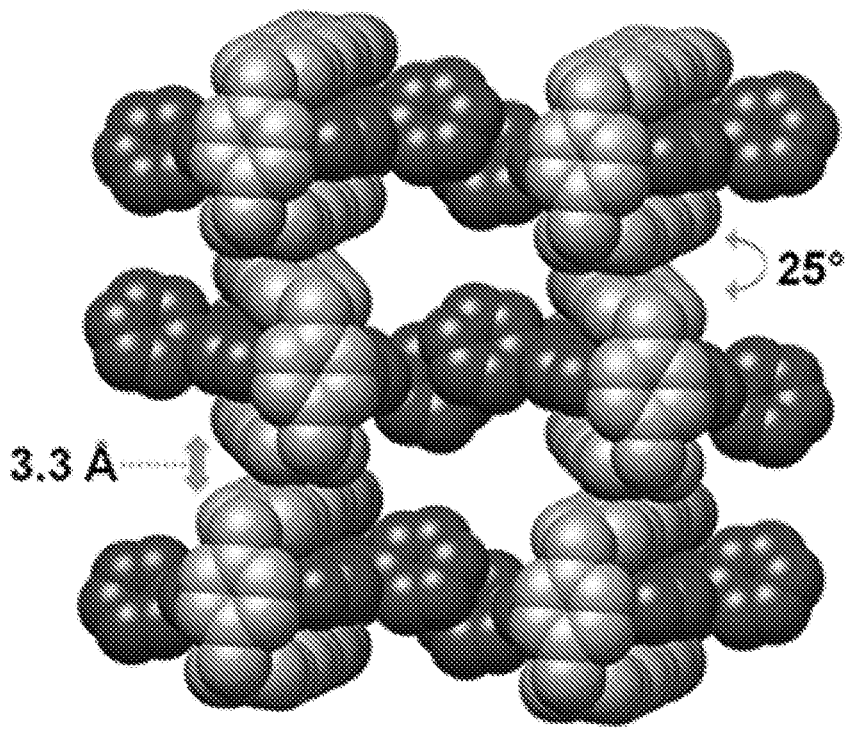
Figure 2E:
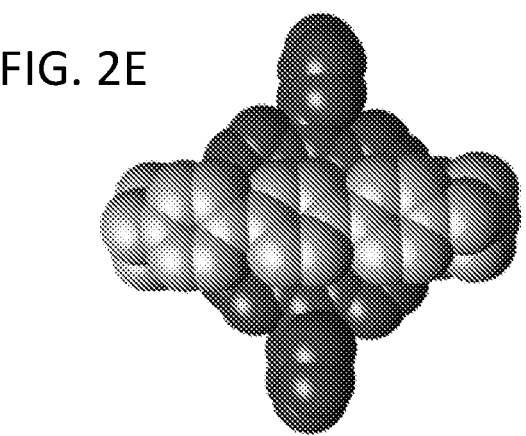
Figure 2F:
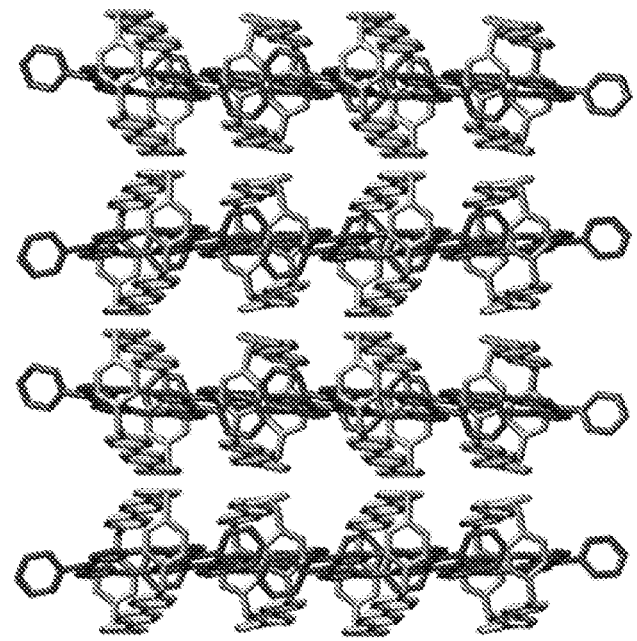
Figure 2G:
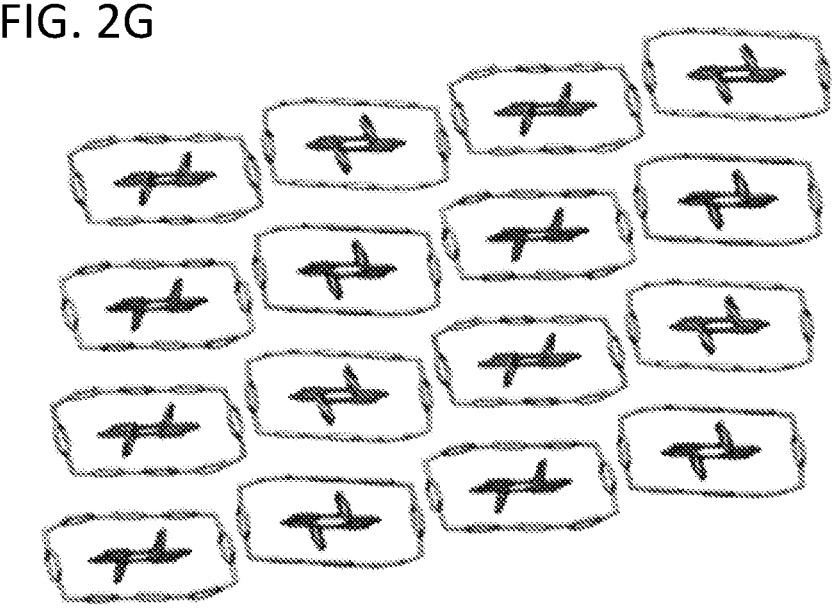
Figure 2H:
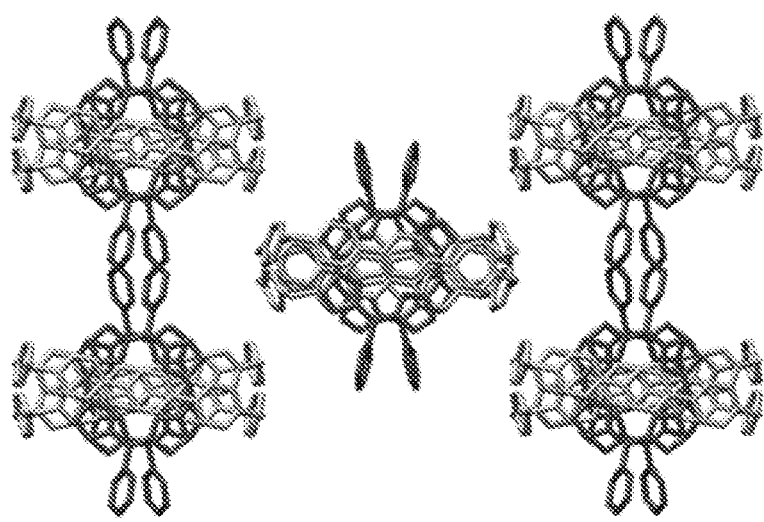

Further evidence of host-guest complex formation between ExBox$^{4+}$ and DPP came from the X-ray diffraction (XRD) analysis (FIGS. 2A-2H) of single crystals of ExBox$^{4+}$ ⊃ DPP grown by slow vapour diffusion of $^i$Pr$_2$O into a solution of ExBox$^{4+}$ and DPP in Me$_2$CO/MeCN (1:1) over the course of 1 week. The cavity of ExBox$^{4+}$ is 14.6 Å in length and 6.3 and 7.1 Å in width at the periphery and center, respectively. The two torsional angles between the pyridinium and phenyl rings[17] associated with the ExBIPY$^{2+}$ unit in ExBox$^{4+}$ are 32° and 27°, which are reduced to 23° and 17° upon complexation with DPP to facilitate its entry into ExBox$^{4+}$ cavity (FIG. 2A) and achieve maximum π-π overlap between the π-electron-rich DPP and π-electron-poor ExBIPY$^{2+}$ units of ExBox$^{4+}$. DPP was accommodated perfectly in the middle of ExBox$^{4+}$ with a π-π distance of 3.3 Å from the ExBIPY$^{2+}$ unit on both sides. C—H . . . π interactions were observed between the meso-hydrogen atoms and para-xylylene rings (C—H . . . π distance 3.8 Å). In order to minimize the steric strain, the two meso-phenyl groups of DPP remain outside of the ExBox$^{4+}$. Intermolecular π . . . π interactions were observed (FIG. 2C-2D) between the two phenyl rings of adjacent DPP and the two phenylene rings of the ExBIPY$^{2+}$ units of adjacent ExBox$^{4+}$ facing each other with a 25° tilt with a short intermolecular π . . . π distance of 3.0 and 3.3 Å, respectively.

Figure 3A:
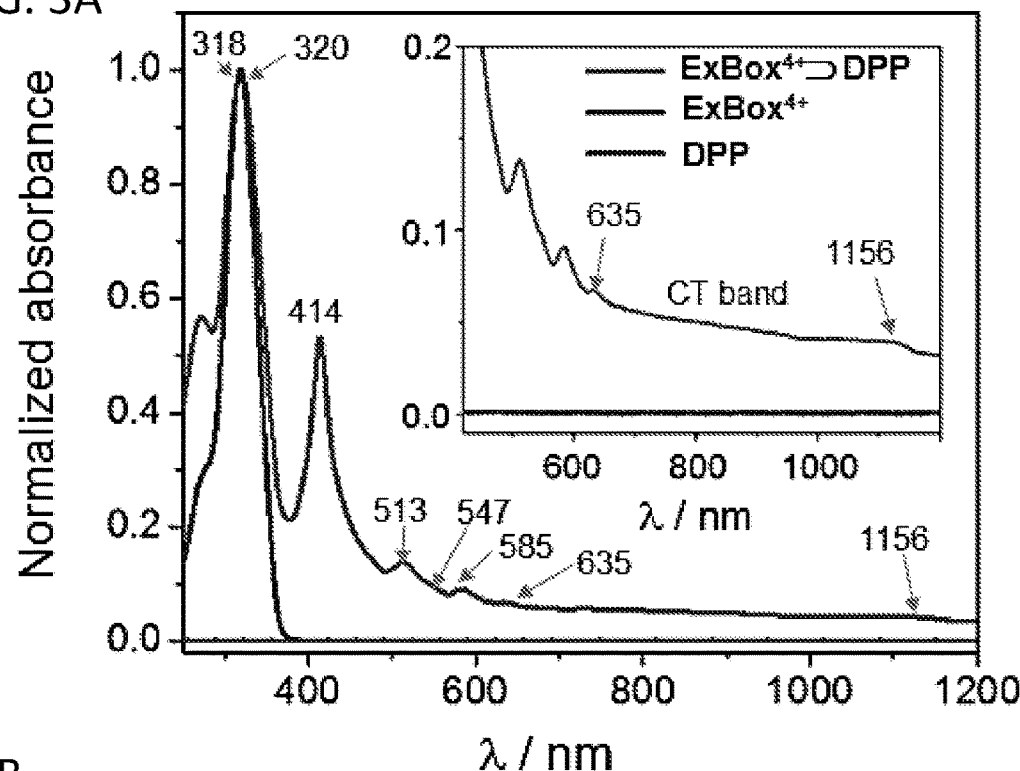
FIGS. 3A-3C.

ExBox$^{4+}$ showed (FIG. 3A) a strong absorbance in H$_2$O in the ultraviolet region at 318 nm, while ExBox$^{4+}$ ⊃ DPP exhibited absorbance peaks at 320, 414, 513, 547, 585, and 635 nm. Of these, the peak at 320 nm originates from ExBox$^{4+}$, the peak at 414 nm could be the Soret-band, and the remaining four peaks are the Q bands of DPP. The peak at 547 nm was not prominent and only appeared as a shoulder to the 513 nm peak. The presence of four Q bands in ExBox$^{4+}$ ⊃ DPP indicates no change in symmetry of DPP after complexation, and exhibit the same vibronic features of free DPP. A low intensity and broad charge-transfer (CT) band (650-1150 nm) appeared in the visible and NIR regions of the spectrum (FIG. 3A), which suggests the existence of inclusion complex in H$_2$O and strong electronic interaction between π-electron rich DPP and acceptor ExBox$^{4+}$. DPP is insoluble in H$_2$O and did not show any absorbance. Steady-state fluorescence spectroscopy of ExBox$^{4+}$ ⊃ DPP confirmed the quenching of DPP-based emission, suggesting the involvement of electron transfer between DPP and ExBox$^{4+}$. Importantly, ExBox$^{4+}$ ⊃ DPP did not generate any singlet oxygen in H$_2$O upon photoexcitation, indicating the complete deactivation of the triplet pathway of DPP inside the ExBox$^{4+}$ cavity.

Figure 3B:
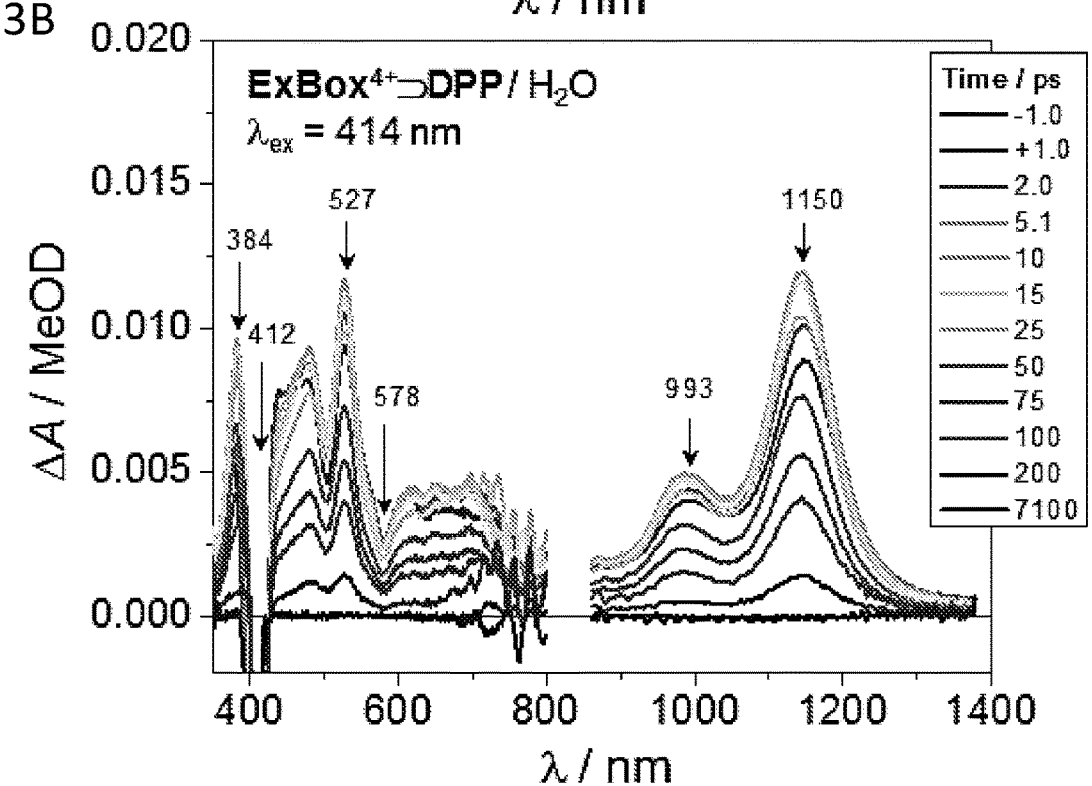
Figure 3C:
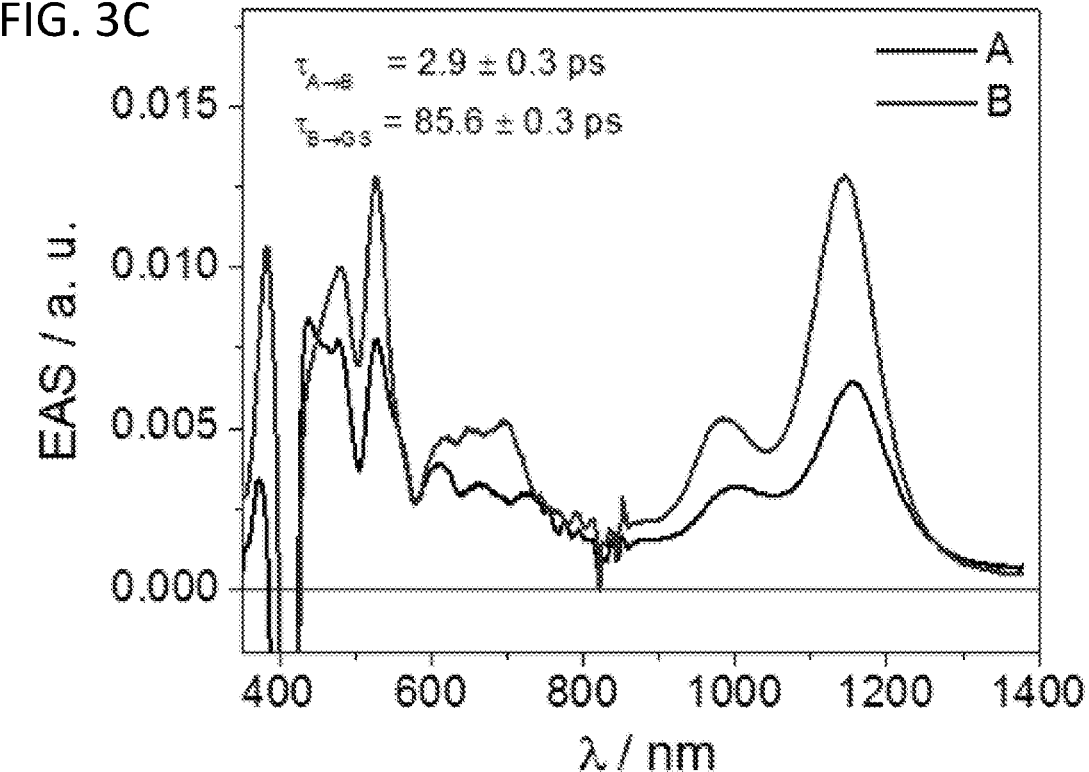

In order to elucidate the fluorescence quenching of DPP in the complex, we performed femtosecond transient absorption (TA) experiments. Analysis of the TA data for ExBox$^{4+}$ ⊃ DPP in H$_2$O exciting the Soret band showed (FIG. 3B) an ultrafast electron transfer to extended viologen units (ExBIPY$^{2+}$) from $^1$*DPP within the first few ps, based on the appearance of the characteristic ExBIPY$^{+•}$ bands at 527, 993 and 1150 nm, along with the porphyrin cation absorption at 384 nm. Since these bands were present immediately following the instrument response, we discern that electron transfer may also compete with rapid internal conversion to the DPP S$_1$ state. Similar electron transfer was also observed when exciting the Q-band of DPP at $\lambda_{ex}$=575 nm, which suggests the ~2 ps rise in ExBIPY$^{+•}$ absorptions corresponds to electron transfer from the lowest singlet excited state of DPP. The multiple, rapid electron transfer timescales observed likely owe to different binding orientations in solution. The charge-separated state lived for 80 ps regardless of excitation wavelength. Importantly, the long-lived triplet state of DPP was not observed following excitation (FIG. 3C), consistent with the result of no singlet oxygen generation by ExBox$^{4+}$ ⊃ DPP.

Figure 4C:
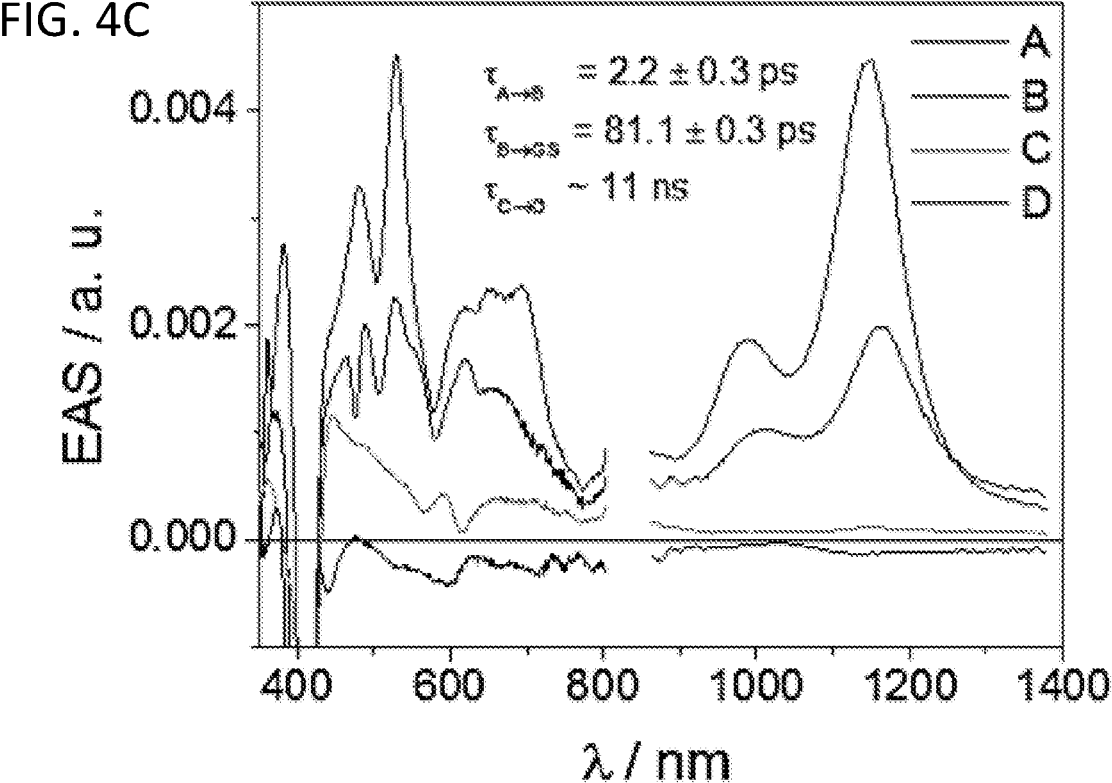
FIGS. 4A-4E.
Figure 4A:
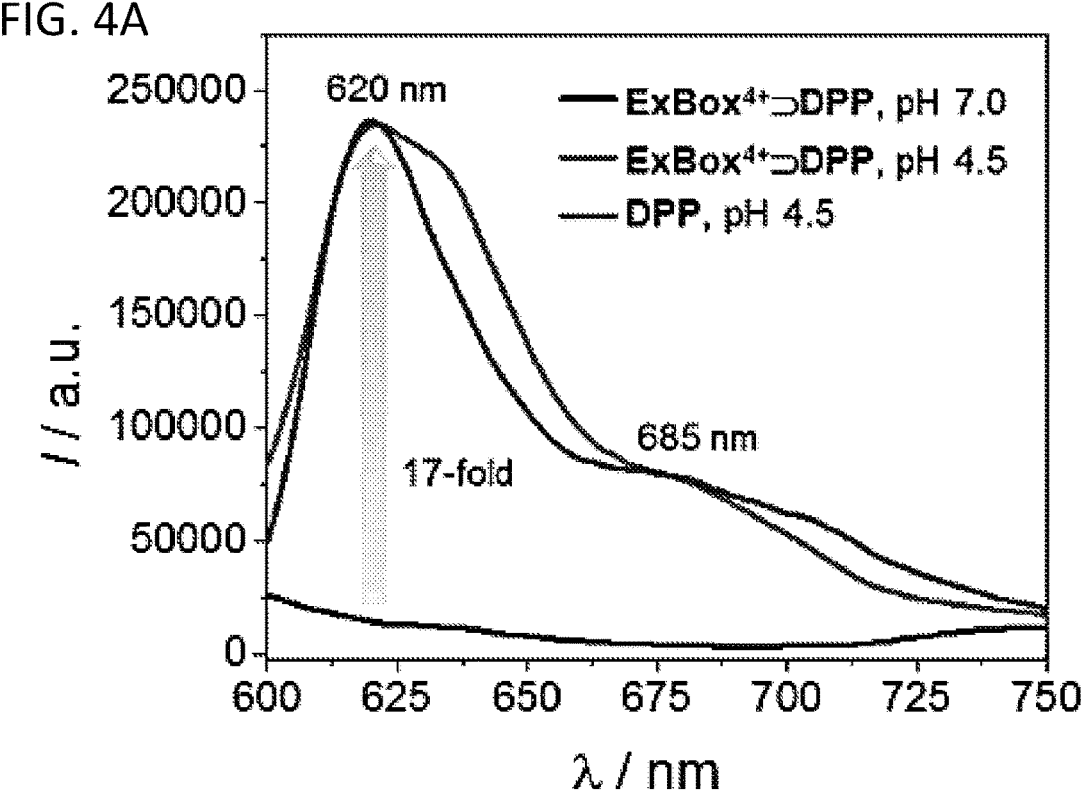
Figure 4B:
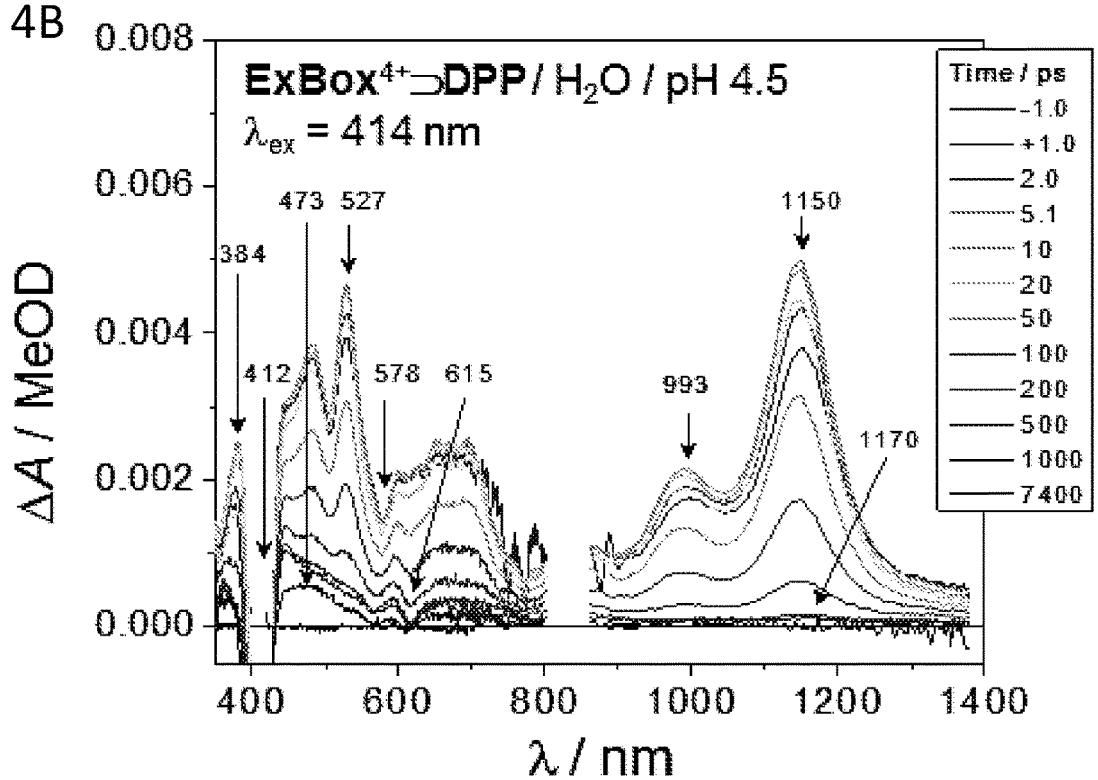
Figure 4D:
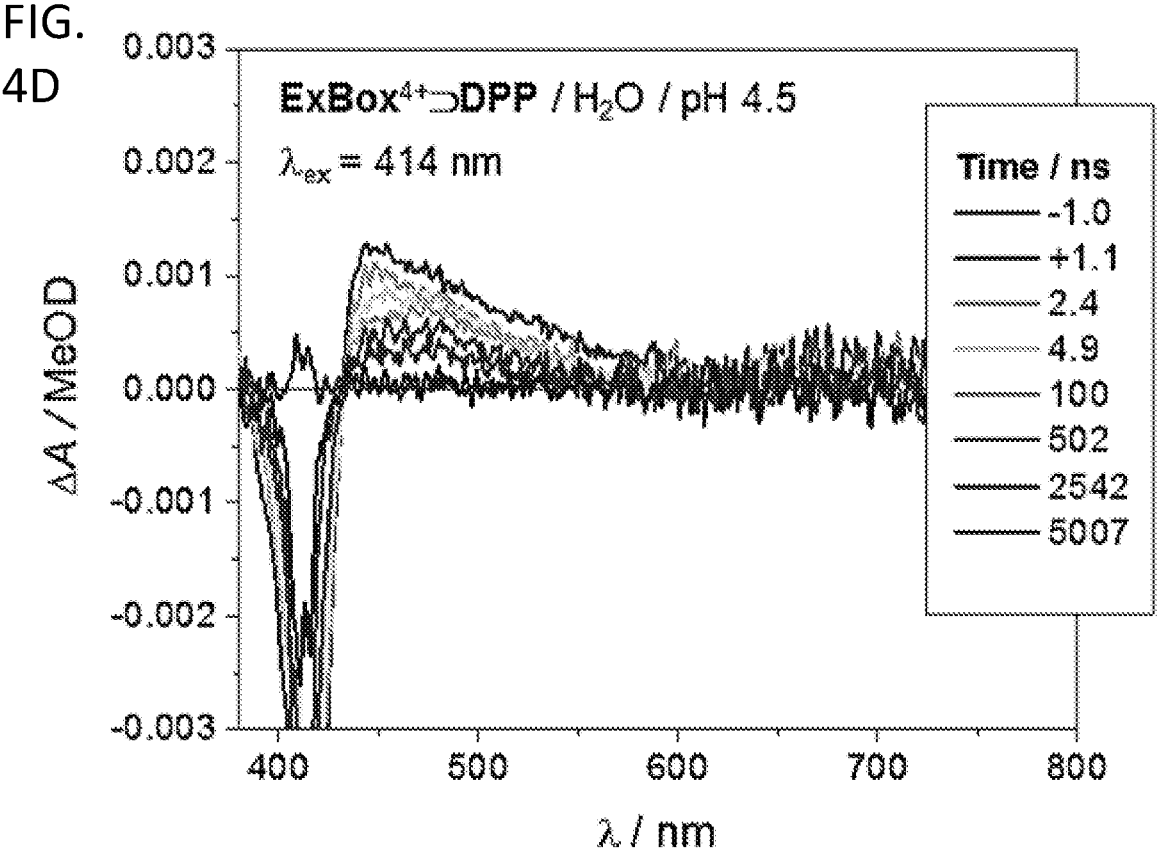
Figure 4E:
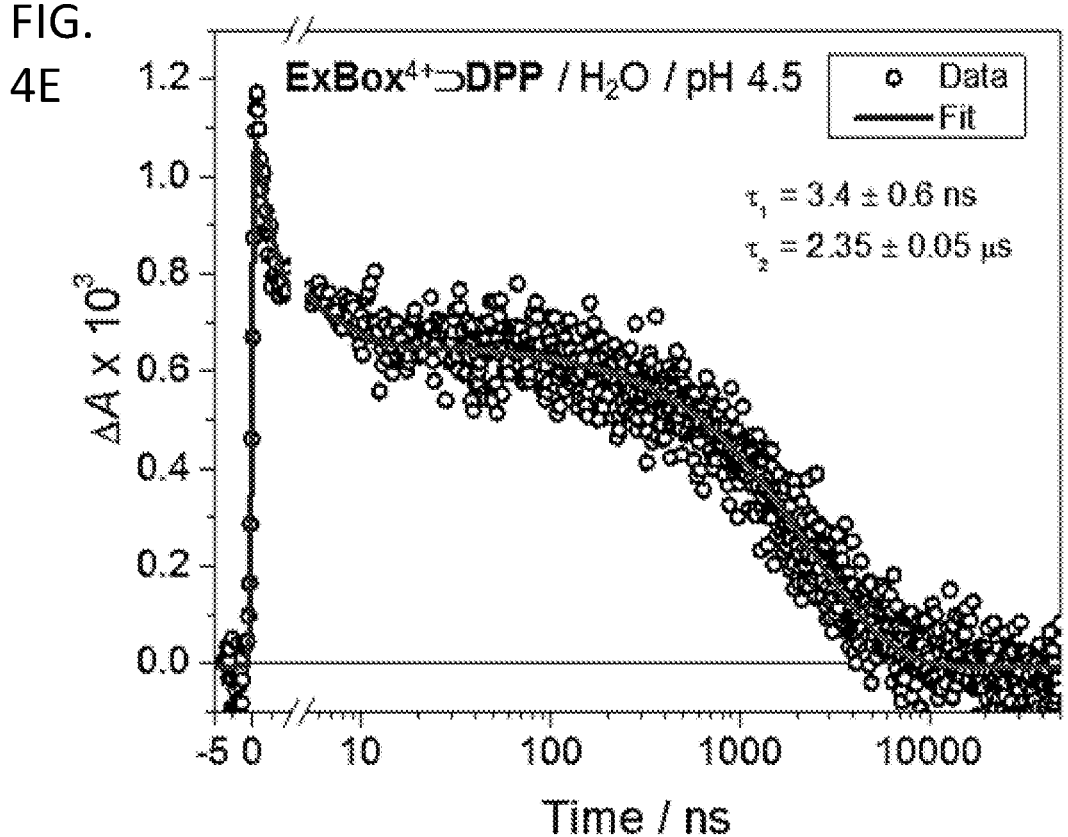

At low pH, DPP can be protonated. Therefore, the electrostatic repulsion between the cationic DPP and the tetracationic host ExBox$^{4+}$ can trigger release of DPP in H$_2$O. Indeed, when aqueanous solution of ExBox$^{4+}$ ⊃ DPP is acidified with HCl (pH 4.5), protonated DPP was released in H$_2$O leading to 17-fold increment of fluorescence signals (FIG. 4A). Furthermore, femtosecond TA spectra of ExBox$^{4+}$ ⊃ DPP in H$_2$O at pH 4.5, exciting the Soret-band at $\lambda_{ex}$=414 nm (FIGS. 4B-4C), revealed the identical charge-separated state living for 80 ps alongside a new, slower component with a lifetime of ~11 ns and the characteristic excited-state absorption (473 and 1170 nm) and stimulated emission (615 nm) features of $^1$*DPP. The residual population survived for several microseconds and has a transient absorption spectrum of $^3$*DPP; the 2.4 time constant (FIGS. 4D-4E) approximates the decay of the long-lived triplet state in aerated, room temperature aqueous solution. These results suggest the protonation and release of DPP in an acidic environment, which turns off the electron transfer in a fraction of the population of the complex and offers access to the triplet state of DPP. We estimate this fraction to be approximately 30% at the ~20 μM concentration of the transient absorption experiments.

Figure 5I:
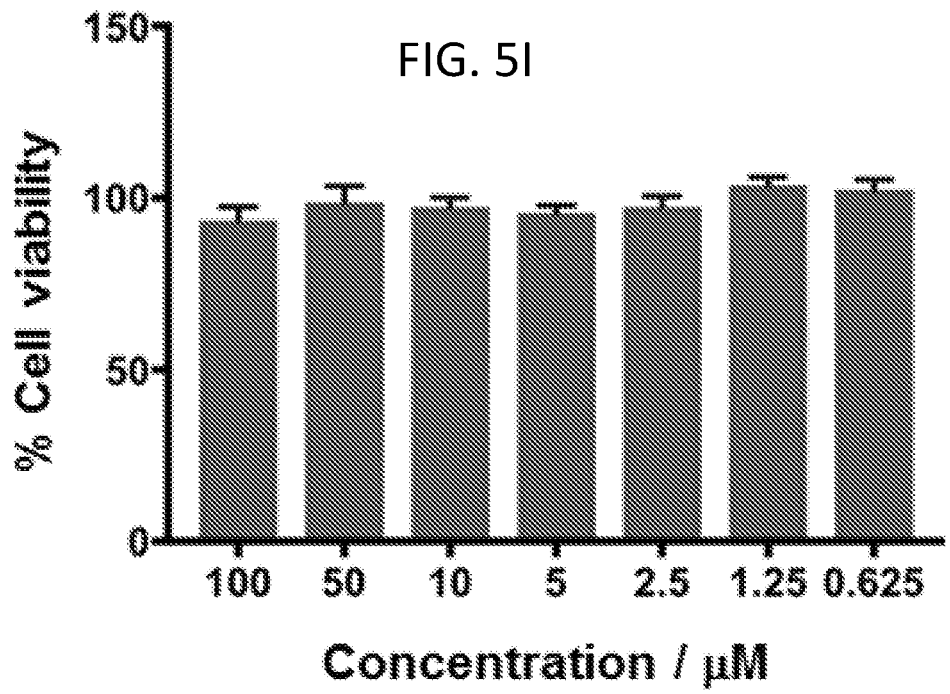
FIGS. 5I-5J. A2780 (FIG. 5I) and MCF-7 (FIG. 5J) cell viability after treatment with different concentrations of ExBox$^{4+}$⊃DPP in PBS in the dark. Cell viability was measured using MTT assay. Error bars represent SD, n=4.
Figure 5J:
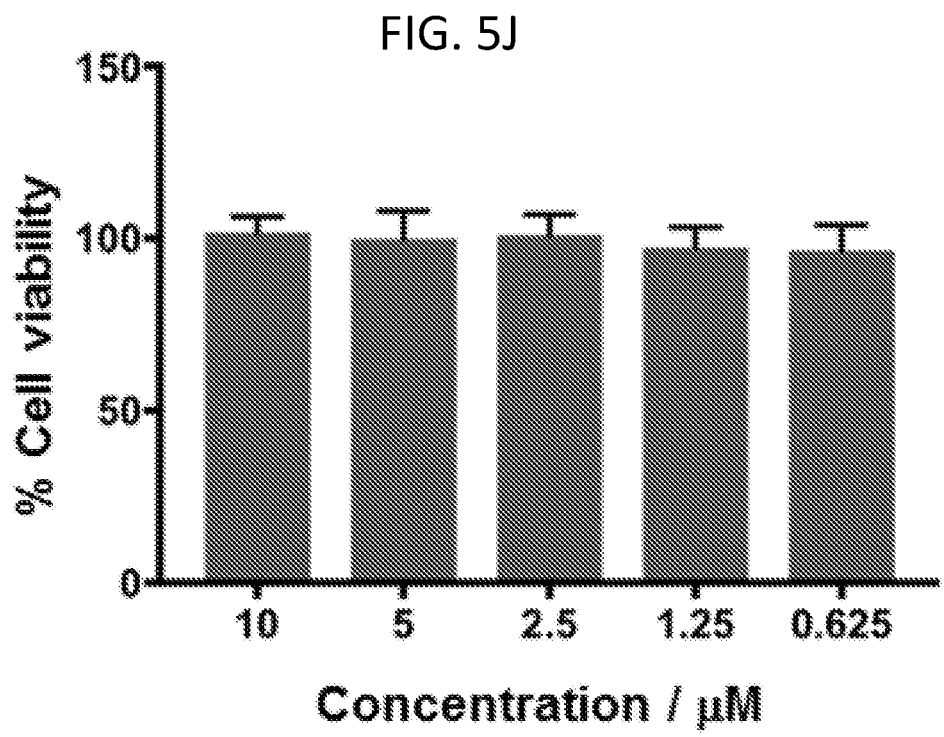
Figure 5L:
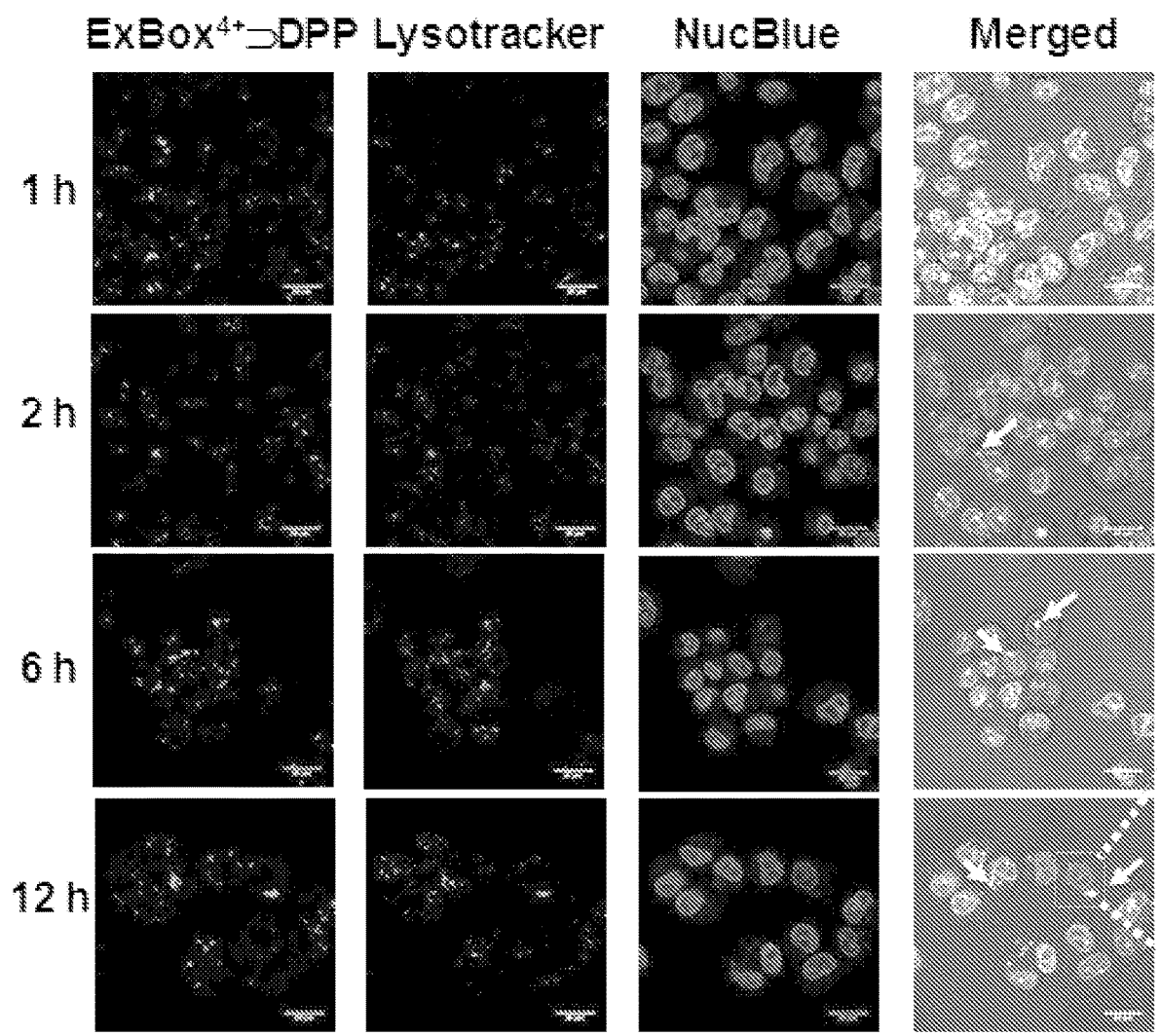
FIG. 5L-5N.
Figure 5M:
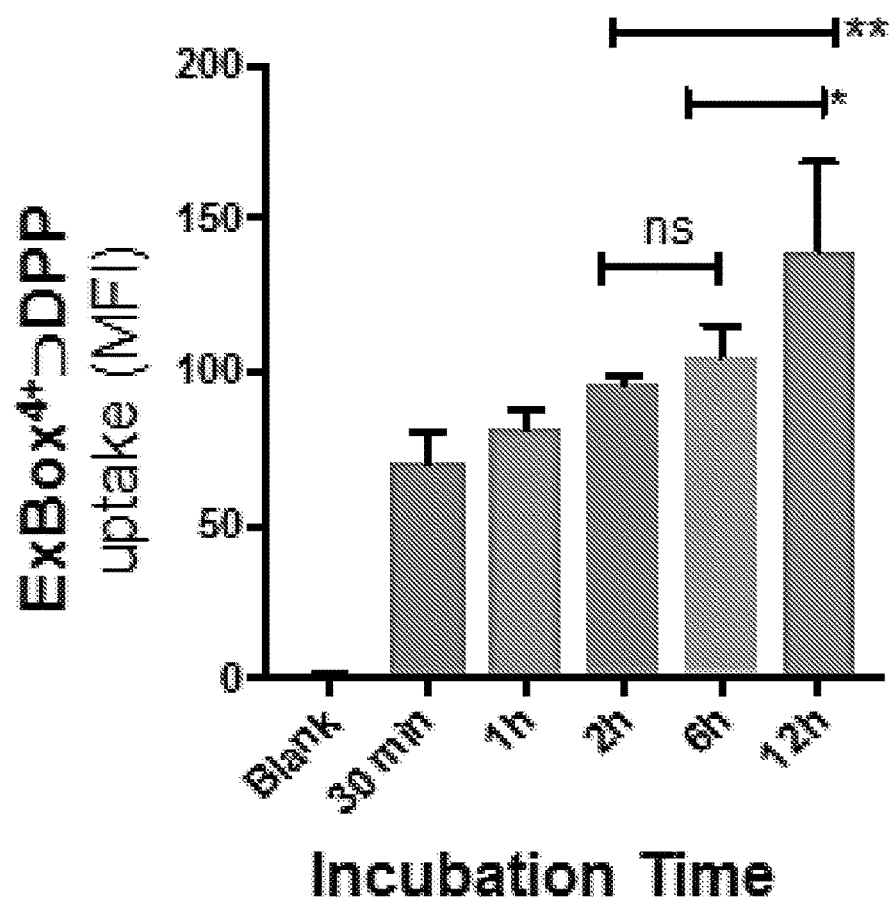
Figure 5N:
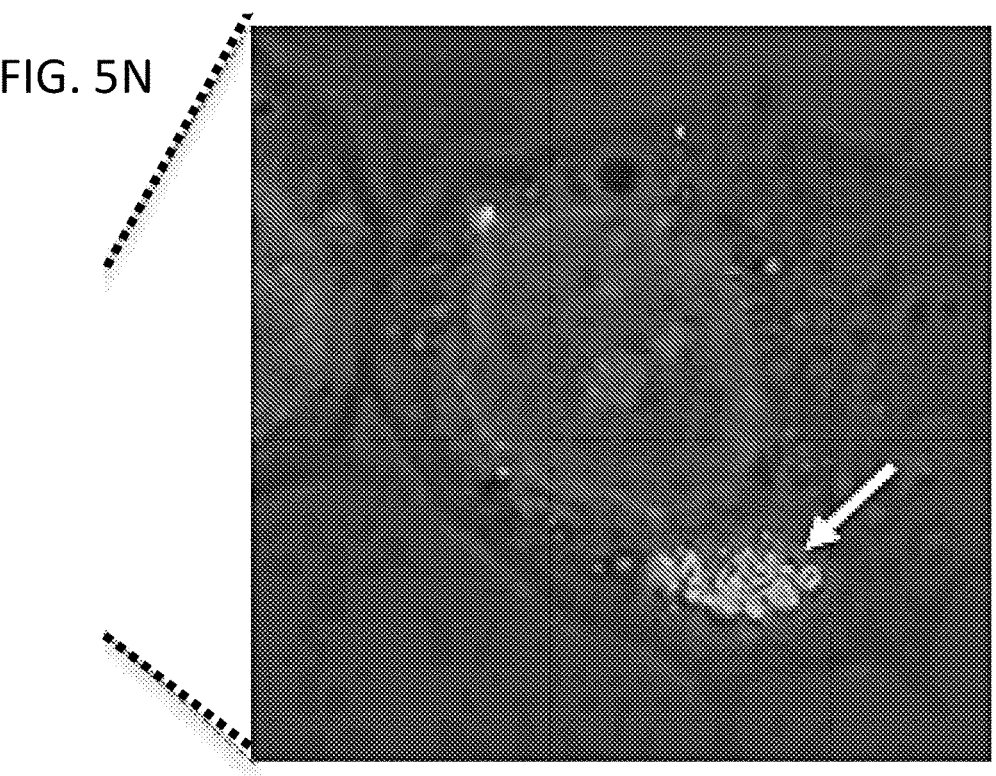
Figure 5O:
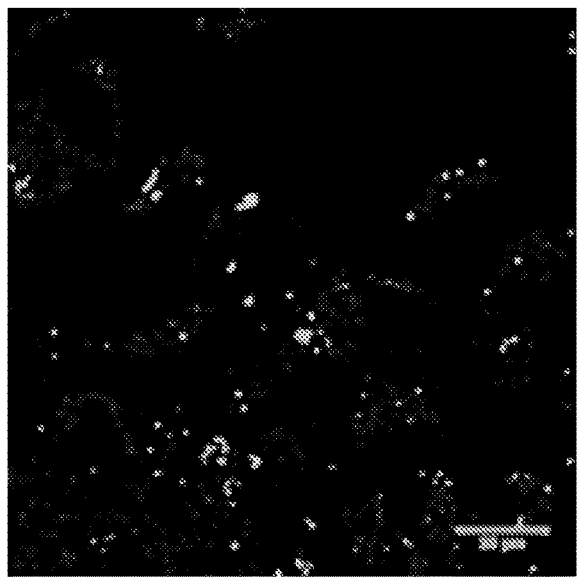
FIG. 5O shows live-cell confocal microscopy images of A2780 cells stained with nuclei stain NucBlue® (blue) and mitochondrial staining dye MitoSpy™ Green FM (green) following incubation with 10 μM of ExBox$^{4+}$⊃DPP (red) in PBS for 12 h. Scale bar is 20 μm.
Figure 5O:
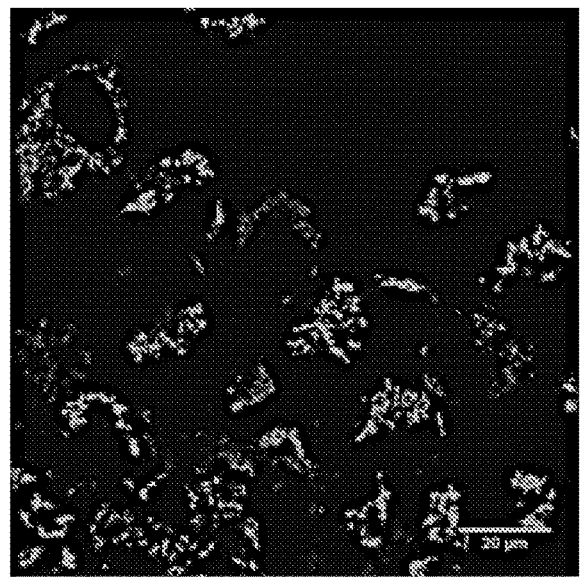
Figure 5O:
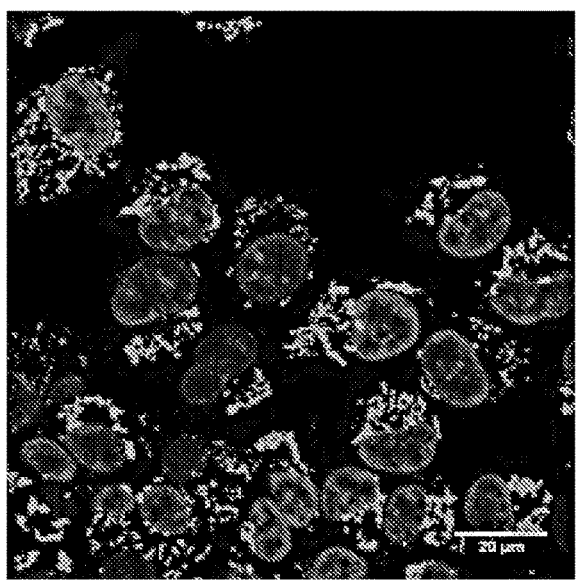
Figure 5O:
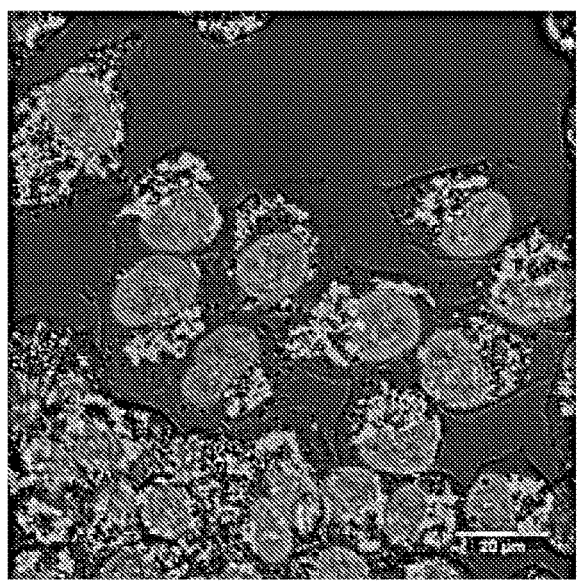

Prior to investigating the cellular uptake of ExBox$^{4+}$ ⊃ DPP, we tested its in vitro cytotoxicity in the dark on A2780 (ovarian) and MCF-7 (breast) human cancer cell lines using MTT assay (FIG. 5I-5J). Incubation of PBS solutions of ExBox$^{4+}$ ⊃ DPP (0.625-100 μM) with A2780 and MCF-7 cells showed >95% viability indicating non-cytotoxic nature of ExBox$^{4+}$ ⊃ DPP. In order to understand the fate of ExBox$^{4+}$ ⊃ DPP in the cellular environment and the ability of ExBox$^{4+}$ to deliver DPP into cancer cells we performed confocal microscopic analysis (FIGS. 5I-5H). Concentration dependent studies showed that ExBox$^{4+}$ ⊃ DPP glows in red and is traceable (FIG. 5K) as punctate inside A2780 cells up to concentrations as low as 0.1 with red laser excitation, indicating the release of DPP inside cellular compartments having an acidic environment. Next, co-localization studies were performed of DPP with both lysotracker and mitospy stains, known to localize in the lysosomes and mitochrondia, respectively. After 1 h incubation of A2780 cells with ExBox$^{4+}$ ⊃ DPP, confocal microscopy revealed only very little DPP-based red fluorescence, with no lysosomal co-localization. However, with increasing incubation time up to 12 h, co-localization of DPP with the green fluorescence of lysotracker was detected, with significantly higher fluorescence signals (FIG. 5L-5N, FIG. 5H), indicating an endolysosomal[28] uptake of ExBox$^{4+}$ ⊃ DPP and release of DPP. Independently, flow cytometry revealed a time-dependent increase in ExBox$^{4+}$ ⊃ DPP uptake and DPP fluorescence signal in A2780 cells. The uptake after 12 h was (FIG. 5N) significantly higher than that at lesser incubation time, consistent with confocal microscopy results. In contrast, after 12 h incubation, we observed separate DPP based red and mitospy (green) signals inside A2780 cells, demonstrating (FIG. 5O) no mitochondrial internalization.

Free DPP is insoluble in water and PBS buffer and can only be delivered into the cells when DPP is inside the cavity of the ExBox$^{4+}$. DPPH$_2^{2+}$ can be taken up, however, by the cells into the lysosomes. Although the lysosomal conditions for protonation of DPP and the release of DPPH$_2^{2+}$ from the ExBox$^{4+}$ cavity are different from this control experiment, the lysosomal uptake (data not shown) of DPPH$_2^{2+}$ is consistent with the uptake of ExBox4+⊃DPP. The cellular uptake, however, is less efficient in the case of DPPH$_2^{2+}$ in comparison to the uptake of the complex ExBox4+⊃DPP, as evidenced from the lower DPPH$_2^{2+}$-based fluorescence intensity inside the cells. As a control experiment we evaluated the PDT efficacy of DPPH$_2^{2+}$ on A2780 cells as free DPP is insoluble in water and PBS buffer and cannot be delivered into the cells. We found that ~90% cells are killed with a 10 µM PBS solution of DPPH$_2^{2+}$ and a light dose of 0.078 J cm$^{-2}$. This result confirms that DPPH$_2^{2+}$ can kill cancer cells when DPPH$_2^{2+}$ is taken up by them into the lysosomes and DPP is delivered as DPPH$_2^{2+}$.

Figure 6A:
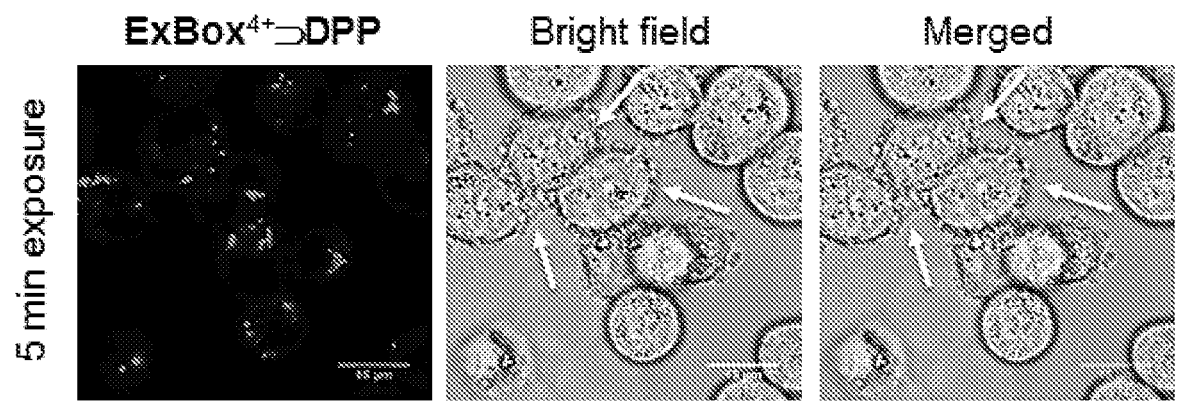
FIGS. 6A-6C shows photodynamic therapy efficacy of ExBox$^{4+}$⊃DPP.
Figure 6B:
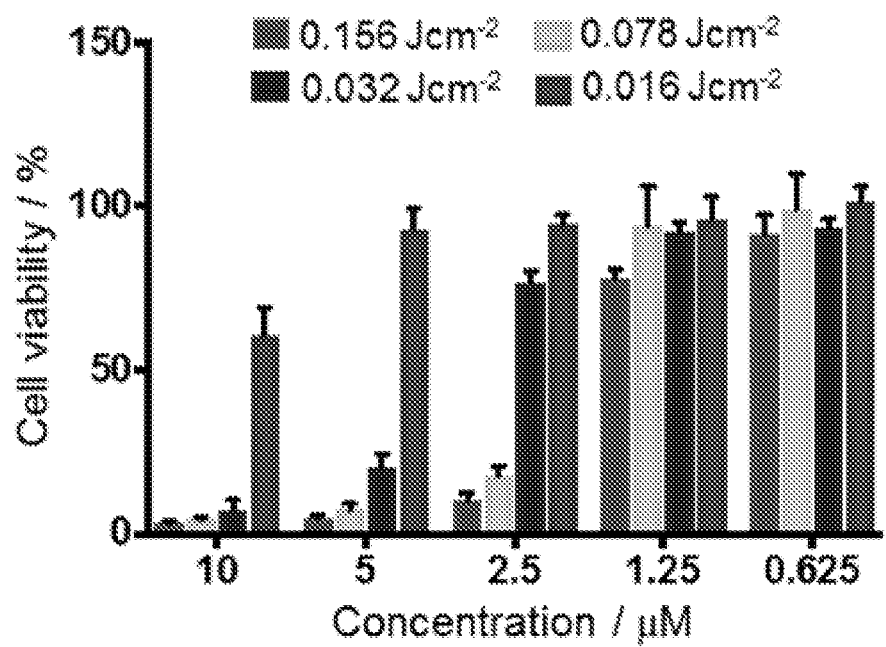
Figure 6C:
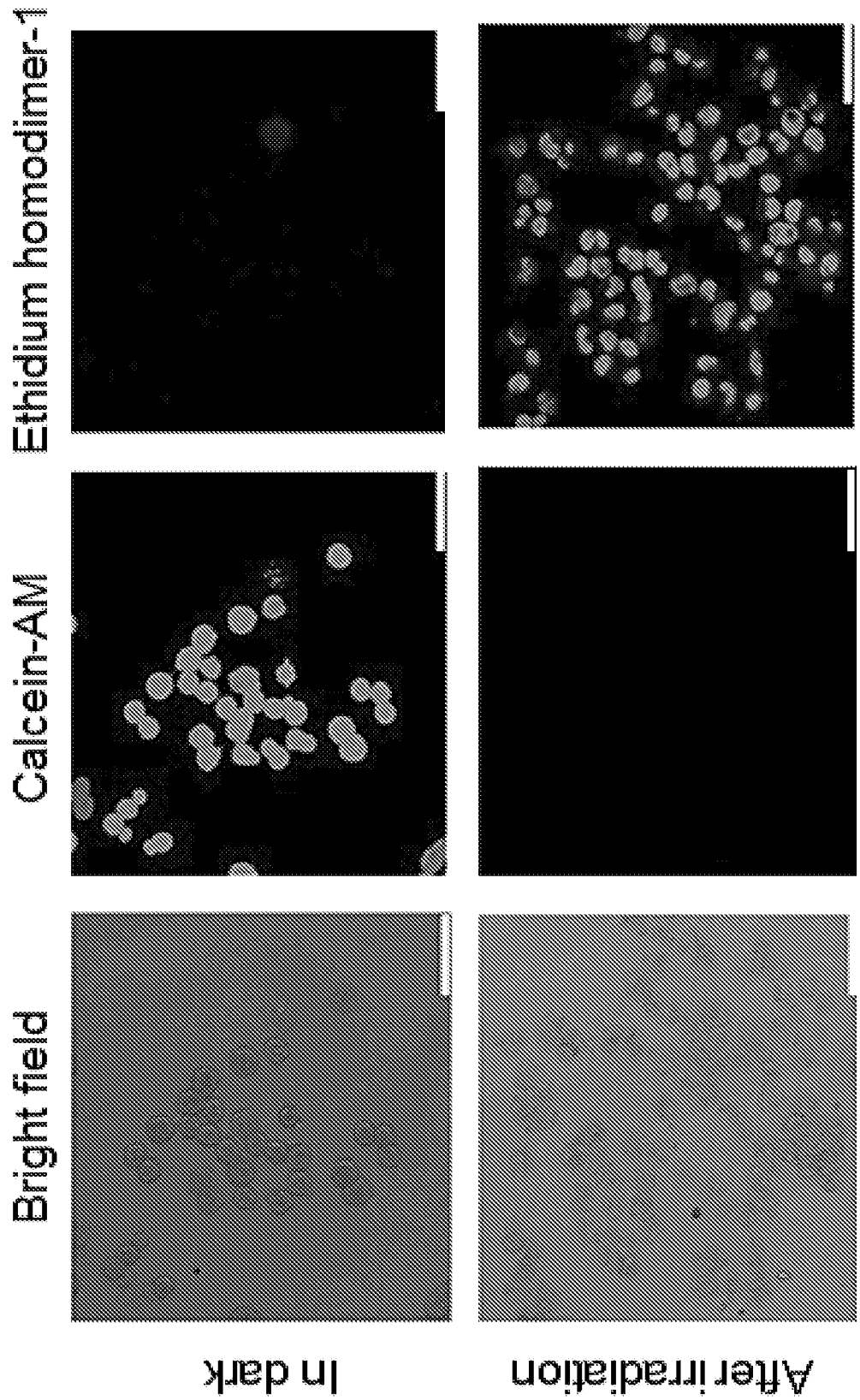
Figure 6D:
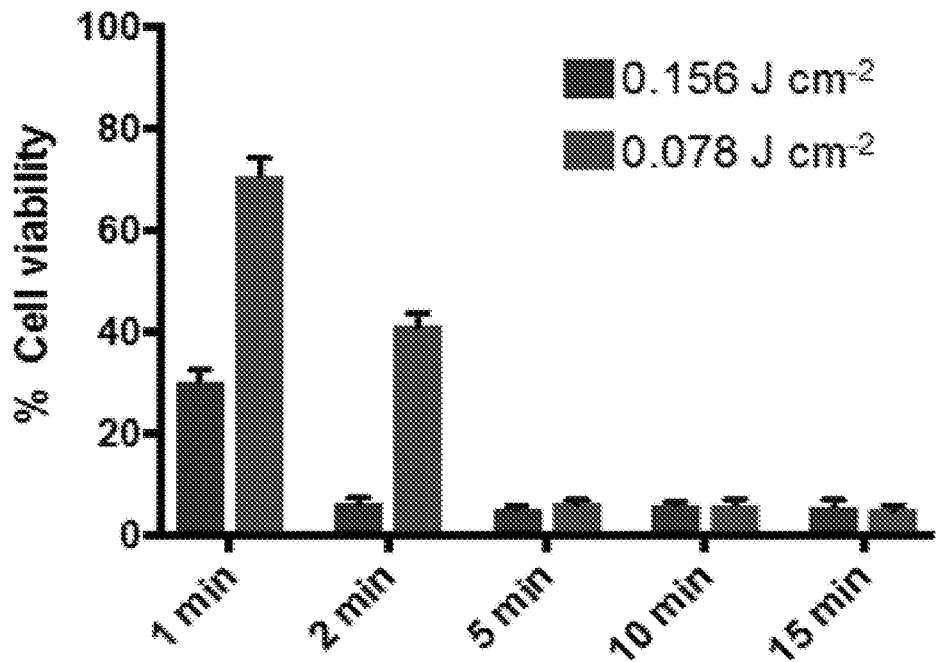
FIG. 6D-6E shows the effect of irradiation time on A2780 cell viability after treatment with (FIG. 6D) 10 µM and (FIG. 6E) 5 µM ExBox$^{4+}$⊃DPP in PBS. Error bars represent SD, n=4.
Figure 6E:
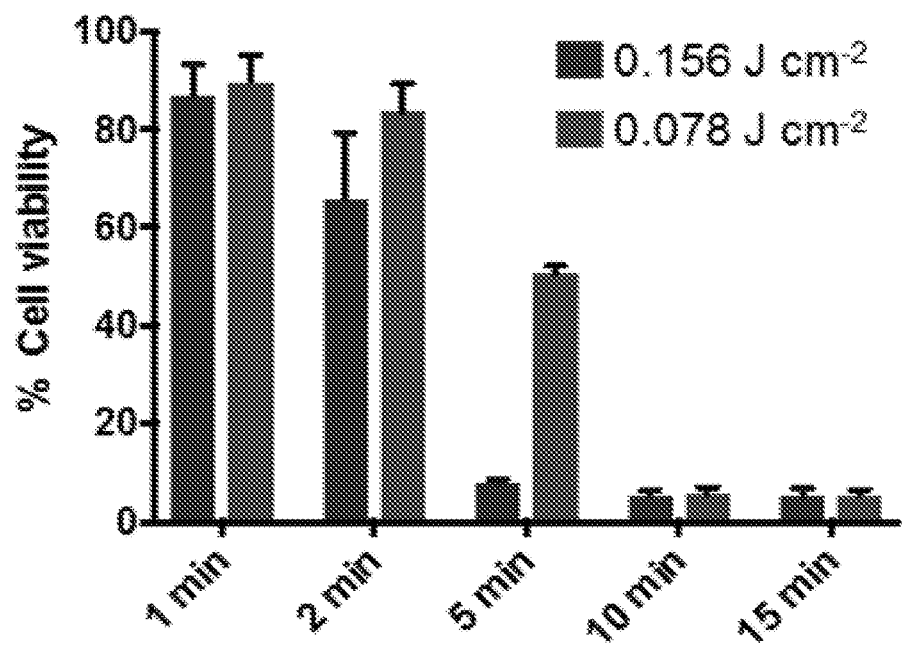
Figure 6F:
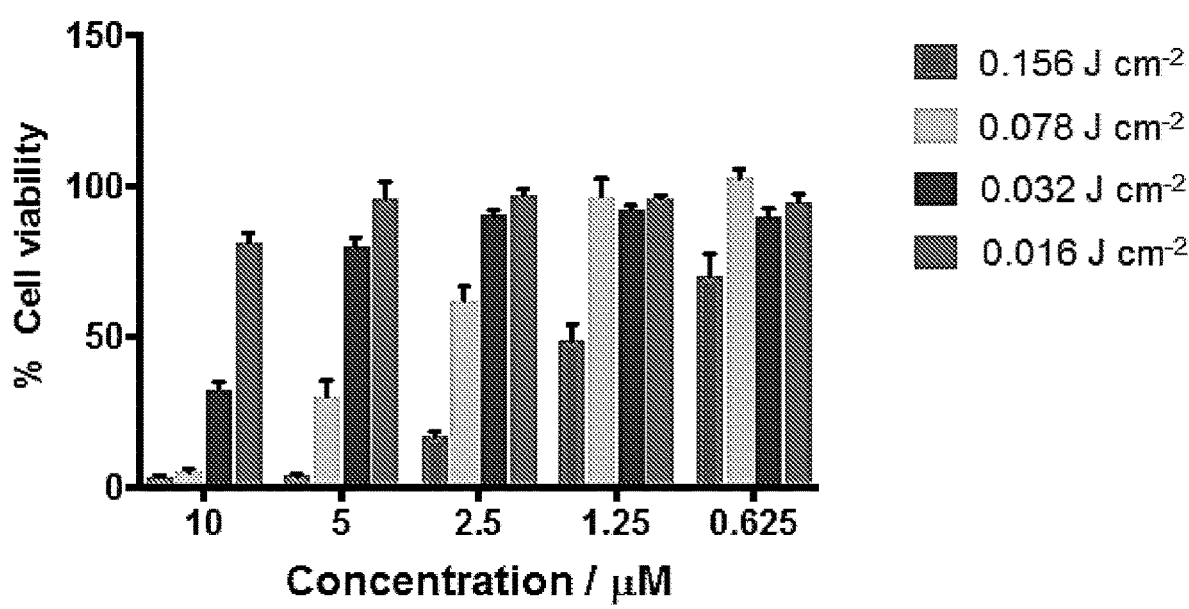
FIG. 6F shows MCF-7 cell viability after treatment with different concentrations of ExBox$^{4+}$⊃DPP in PBS and irradiation with different light doses for 10 min. Cell viability was measured using MTT assay. Error bars represent SD, n=4.

Next, we determined the in vitro PDT efficacy of ExBox$^{4+}$⊃DPP on A2780 cells. Initially, we tested a range of concentrations (0.01-10 µM) of ExBox$^{4+}$⊃DPP in PBS on A2780 cells to determine working concentrations for PDT. After 10 min visible light irradiation with different doses (0.078 and 0.156 J cm$^{-2}$), 10 µM of ExBox$^{4+}$⊃DPP showed >95% killing of A2780 cells, while other concentrations (0.1, 0.05 and 0.01 µM) were less efficient. In MTT assay, upon exposure to 0.078 and 0.156 J cm$^{-2}$ light doses, 2.5, 5, and 10 µM concentrations of ExBox$^{4+}$⊃DPP showed >90% A2780 cell-death, while lower concentrations (1.25 and 0.625 µM) had almost no effect on cell viability (FIG. 6B). On the other hand, a light dose of 0.032 J cm$^{-2}$ was efficacious only at 5 and 10 µM concentrations of ExBox$^{4+}$⊃DPP, while a light dose of 0.016 km$^{-2}$ had no effect on cell viability under same ExBox$^{4+}$⊃DPP concentrations. We note that this photoinduced toxicity may be attributed to the combined effect of the singlet oxygen production from the released DPPH$_2^{2+}$ as well as the formation of radical cations as a result of the electron transfer process in the residual undissociated complex ExBox$^{4+}$⊃DPP in lysosomes. PDT efficacy of ExBox$^{4+}$⊃DPP on A2780 cells was supported using a Calcein-AM/Ethidium homodimer-1 assay where live and dead cells interact with Calcein-AM and Ethidium homodimer-1, respectively. Under dark conditions, A2780 cells treated with ExBox$^{4+}$⊃DPP interacted mainly with Calcein-AM resulting in (FIG. 6C) bright green fluorescence. In contrast, after irradiation with 0.156 J cm$^{-2}$ light dose for 10 min, A2780 cells showed red fluorescence, indicating an interaction with only Ethidium homodimer-1, which was consistant with the MTT assay (FIG. 6B). Irradiation time was found to be dependent on the ExBox$^{4+}$⊃DPP concentration and light dose (FIG. 6D-6E). With 0.156 J cm$^{-2}$ light dose and 10 µM ExBox$^{4+}$⊃DPP treatment, 2 min of irradiation was sufficient to kill >90% of cells, while 0.078 J cm$^{-2}$ light dose and 5 µM ExBox$^{4+}$⊃DPP required (FIG. 6D-6E) 10 min to kill >90% A2780 cells. A similar trend was observed (FIG. 6F) with MCF-7 cancer cell line treated with ExBox$^{4+}$⊃ under light irradiation.

Figure 6G:
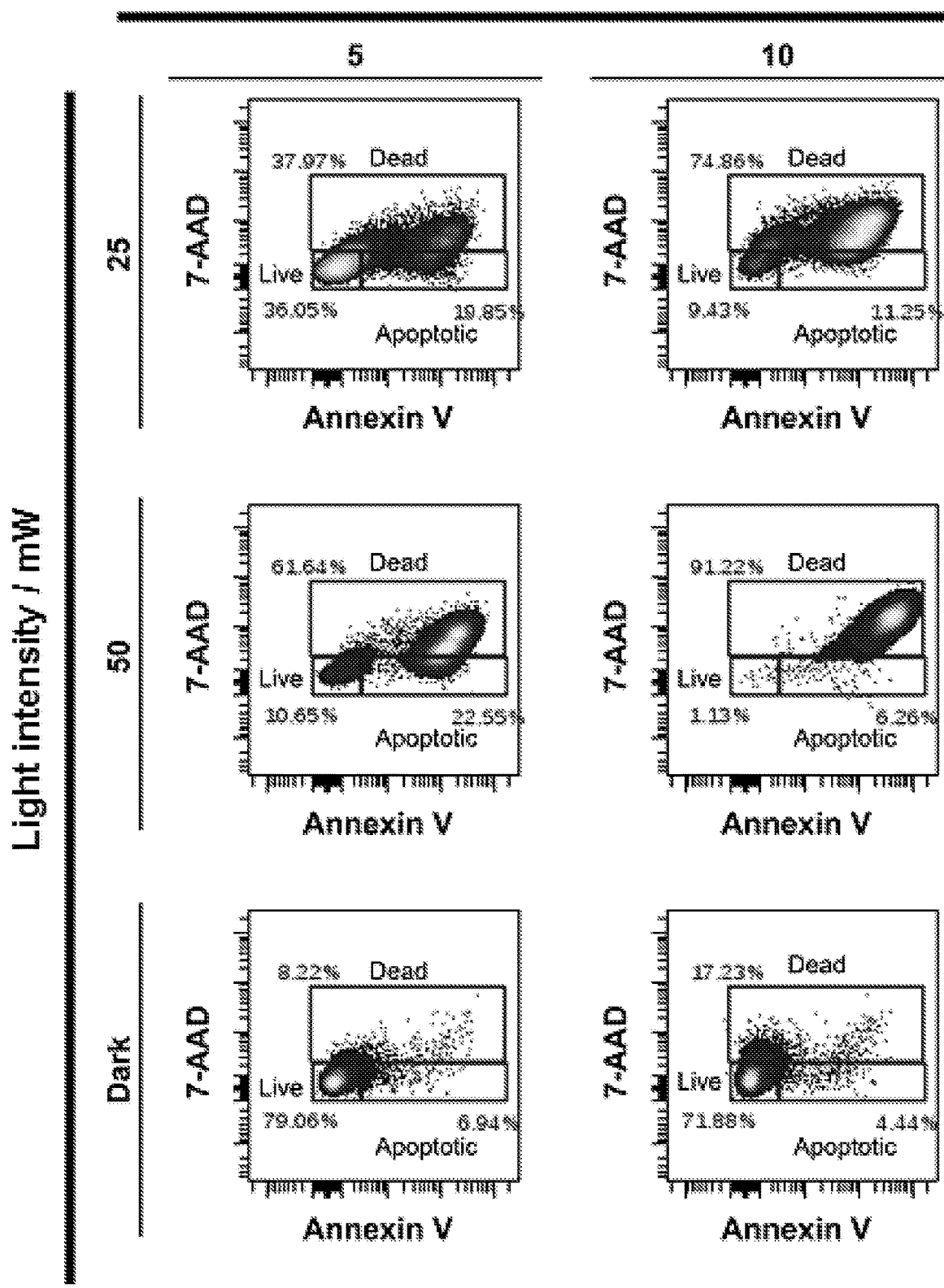
FIG. 6G shows representative Annexin V Apoptosis flow assay contour plots of A2780 cells treated with ExBox$^{4+}$⊃DPP (5 and 10 either exposed to light at two different intensities (25 and 50 mW) or kept in the dark. Gates are shown as blue boxes with values (in blue) representing the percentage of events within each gate. The x-axis represents the Annexin V FITC fluorescence intensity, and the Y-axis represents the 7-AAD fluorescence intensity.
Figure 6H:
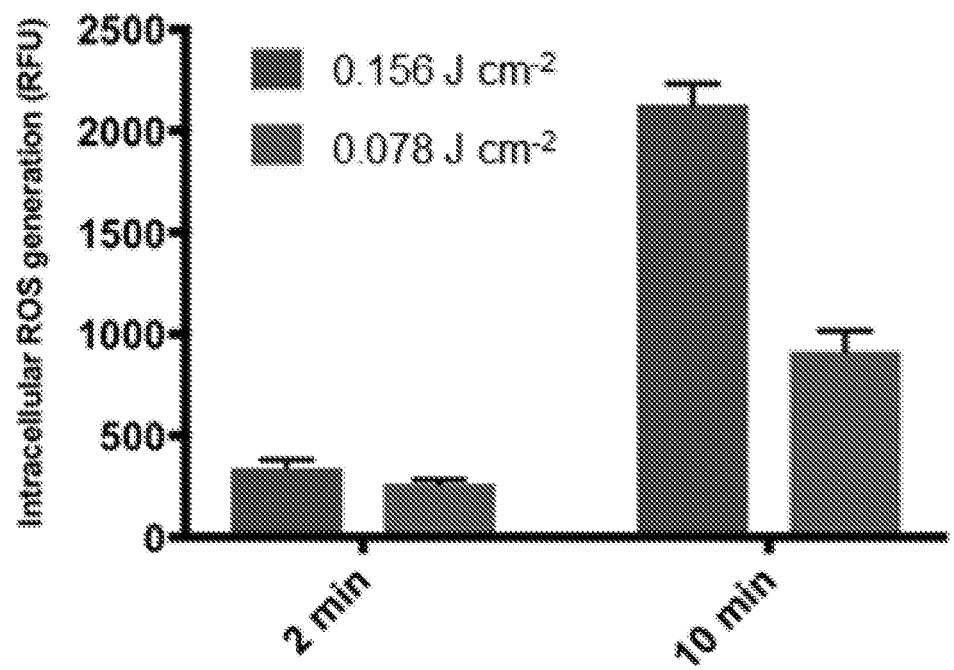
FIG. 6H-6I shows the effect of irradiation time on ROS generation in A2780 cells after treatment with (FIG. 6H) 10 µM and (FIG. 6I) 5 µM ExBox$^{4+}$⊃DPP. Error bars represent SD, n=4.
Figure 6I:
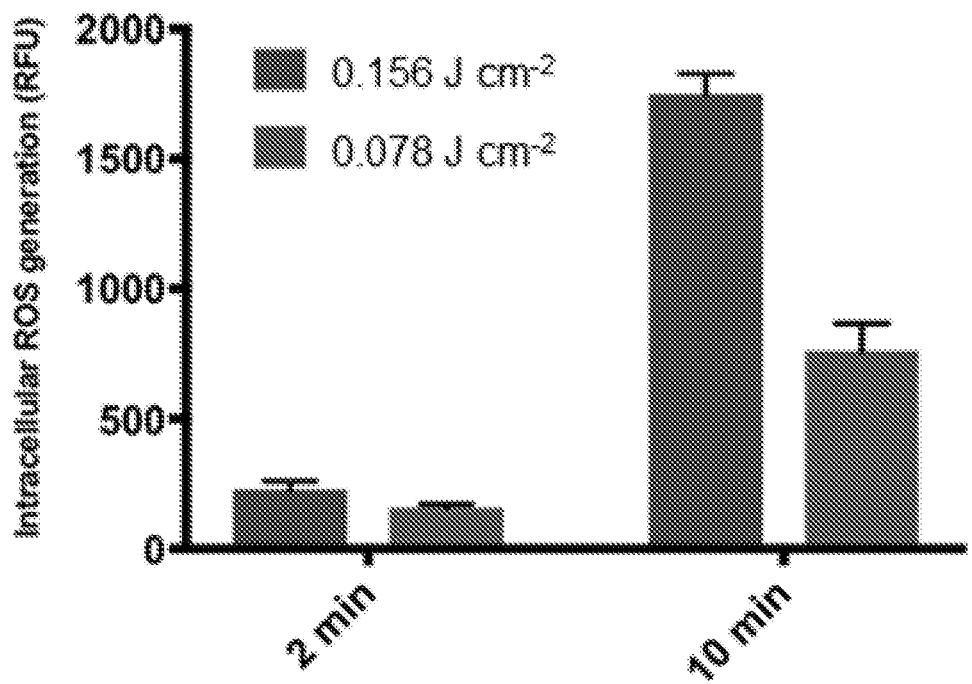

We performed Annexin V FITC/7-AAD assay post 3 h irradiation on ExBox$^{4+}$⊃DPP-treated A2780 cells to understand the cellular behavior and measure apoptotic and dead cells. Annexin V binds to phosphatidylserine in the plasma membrane in early apoptotic cells or live cells and 7-AAD (7-amino-actinomycin D) strongly binds to DNA but exclude intact or live cells during flow cytometry (FIG. 6G). At 10 µM ExBox$^{4+}$⊃DPP and 0.078 or 0.156 Jcm$^{-2}$ light dose treatments, a smaller number of apoptotic cells were apparent when compared with 5 µM ExBox$^{4+}$⊃DPP with same light doses. In contrast, A2780 cells treated with 5 or 10 µM ExBox$^{4+}$⊃DPP under dark conditions showed 79 and 72% intact cells, respectively. These results suggest that ExBox$^{4+}$⊃DPP irradiation treatment may initiate necrotic cell death, depending on the concentration and light dose. We also evaluated for any signs of cell injury under irradiation using real-time confocal microscopy. After 5 min of continuous irradiation (laser intensities were adjusted to 25 mW), A2780 cells treated with ExBox$^{4+}$⊃DPP showed blebs on their surface, indicative (FIG. 6A) of cell necrosis or apoptosis. Normal imaging conditions, however, showed no signs of cell injury or blebbing. Intracellular ROS generation induced by photosensitizer-irradiation were reported[29] to be the major cause of oxidative stress and tumor cell death. Therefore, we measured the intracellular ROS generation post irradiation in A2780 cells. Significantly, a 20-fold increase in intracellular ROS was evident after ExBox$^{4+}$⊃DPP irradiation (10 µM/0.156 J cm$^{-2}$ light dose) compared (FIG. 6H-6I) with that in dark or untreated cells. In addition, intracellular ROS generation post 0.156 J cm$^{-2}$ light dose was found to be greater than that by post 0.078 J cm$^{-2}$ light dose, demonstrating a direct relation of ROS generation and light dose. The amount of ROS generation also depended on the irradiation time (FIG. 6H-6I).

In summary, we identified a biomimetic photoprotective mechanism in the supramolecular complex ExBox$^{4+}$⊃DPP, synthesized by trapping a hydrophobic guest DPP into the cavity of a tetracationic host receptor ExBox$^{4+}$. The hydrophilic ExBox$^{4+}$ prevents π-π stacking of the DPP, renders it soluble in H$_2$O, and modulates the phototoxicity of DPP. While trapping leads to the quenching of DPP singlet state, inhibiting the formation of $^3$*DPP by picosecond electron transfer to provide photoprotection, a pH-dependent release of DPP recovers its triplet state decay pathway and thereby activates its ability of ROS generation in oxygenic conditions. Furthermore, ExBox$^{4+}$⊃DPP treatment of cells did not show cytotoxicity in the dark, even with a loading concentration as high as 100 µM. Confocal microscopy revealed that ExBox$^{4+}$⊃DPP is taken up by lysosomes of cancer cells, where DPP gets protonated in the acidic environment, leading to its release. This cellular internalization process was monitored by utilizing the fluorescence of released DPP at a broad range of concentrations (0.1-10 µM). A time-dependent study indicated that the cellular uptake process could be governed by endocytosis. In vitro investigations revealed that upon irradiation with visible light, DPP generates 20 times more ROS inside cancer cells compared to in the dark and kills them efficiently in a single treatment within 10 min, even with a dose as low as 0.078 J cm$^{-2}$ and a loading concentration of 10 µM. The ability of multifunctional synthetic receptor ExBox$^{4+}$ in photoprotection, efficient lysosomal delivery, and pH triggered release of a photosensitizer facilitates the use of ExBox$^{4+}$⊃DPP in anticancer therapy via regulated PDT. This approach is useful in supramolecular medicine[30] for developing new pharmaceutical formulations of photosensitive drugs, enhancement of drugs photostability and regulating their therapeutic activity.

Materials/General Methods/Instrumentation

All chemicals and reagents were purchased from commercial suppliers (Aldrich or Fisher) and used without further purification. ExBox•4PF$_6$ was synthesized according to previous literature procedures[1]. 5,15-Diphenylporphyrin (DPP) was purchased from TCI chemicals. The synthesis of counterion exchanged product ExBox•4Cl, and ExBox$^{4+}$ ⊃ DPP are described in Synthetic Protocols. Thin layer chromatography (TLC) was performed on silica gel 60 F254 (E. Merck). Column chromatography was carried out on silica gel 60F (Merck 9385, 0.040-0.063 mm). Nuclear magnetic resonance (NMR) spectra were recorded on an Agilent Hg400 and Bruker Avance III spectrometers, with working frequencies of 400 and 500 MHz, respectively. Chemical shifts were reported in ppm relative to the signals corresponding to the residual nondeuterated solvents (CD$_3$CN: δ 1.94 ppm). UV/Vis Absorption spectra were recorded using a UV-3600 Shimadzu spectrophotometer. Steady-state emission spectra were acquired using HORIBA Nanolog spectrofluorimeter equipped with an integrating sphere.

The setup for transient absorption measurements has been described elsewhere.[3] Photoexcitation pulses at 414 nm were obtained through a beta barium borate (BBO) crystal doubling the fundamental, and the 575 nm pulses were generated with a laboratory-constructed optical parametric amplifier. The pulse power for photoexcitation was attenuated to ~1 µJ/pulse, using neutral density filters. The pump polarization was randomized employing a commercial depolarizer (DPU-25-A, Thorlabs, Inc.) to eliminate any orientational dynamics contributions from the experiment. All the spectra were collected on a commercial spectrometer (Ultrafast Systems, LLC Helios and EOS spectrometers, for fsTA and nsTA, respectively). All samples were stirred to avoid localized heating or degradation effects. The optical density was maintained around 0.5 for all samples.

Synthesis of ExBox$^{4+}$ ⊃ DPP.

The synthesis of ExBox•4PF$_6$ was carried out according to a literature procedure. [Barnes, J. C. et al. *J. Am. Chem. Soc.* 135, 183-192 (2013)] ExBox•4Cl was precipitated by dissolution of ExBox•4PF$_6$ in MeCN, followed by the addition of $^n$Bu$_4$NCl. The precipitate was collected, and excess of $^n$Bu$_4$NCl was removed by multiple H$_2$O washing to yield pure ExBox•4Cl.

Solid 5,15-diphenylporphyrin (DPP) (0.46 mg, 1 mmol) was dissolved in Me$_2$CO (1 mM, 1 mL) and added to a solution of ExBox•4Cl in H$_2$O (1 mM, 1 mL). The mixture was sonicated for 5 mins, Me$_2$CO was removed in vacuum, and the H$_2$O portion was passed through a 0.45 µm filter to yield ExBox$^{4+}$ ⊃ DPP complex in H$_2$O.

NMR Spectroscopy

The $^1$H NMR (298 K, 500 MHz) titration was performed by adding small volumes of a solution of DPP in Me$_2$CO-d6 to a solution of ExBox•4PF$_6$ in Me$_2$CO-d6. The upfield shifts of the $^1$H NMR resonances for —CH$_2$ protons were observed and used to determine the association constants ($K_a$) from a 1:1 binding model that employs nonlinear least-squares regression on host-guest binding data.

(CD$_3$)$_2$CO stock solutions of ExBox$^{4+}$ (0.4 mM) and DPP (5.4 mM) were prepared. A 500 µL aliquot of ExBox$^{4+}$ was taken in a NMR tube and titrated with DPP solution. The NMR spectra were recorded after each addition of DPP solution. The binding constant was obtained from a 1:1 binding model by utilizing the change in the chemical shift value of the probe (*) peak.

Crystallographic Characterization a) Method: Single crystals of ExBox$^{4+}$ ⊃ DPP were grown by slow vapor diffusion of $^i$Pr$_2$O into a solution of ExBox$^{4+}$ and DPP in Me$_2$CO/MeCN (1:1) over the course of 1 week. A suitable crystal was selected, and the crystal was mounted on a MITIGEN holder in Paratone oil on a Bruker Kappa APEX CCD area detector diffractometer. The crystal was kept at 100 K during data collection. Using Olex2,[2] the structure was solved with the ShelXT[3] structure solution program using Direct Methods and refined with the ShelXL[4] refinement package using Least Squares minimization.

b) Crystal Data for C$_{87}$H$_{74}$F$_{24}$N$_{10}$OP$_4$, Monoclinic, space group P2/c (no. 13), a=31.4603(19), b=15.0357(9), c=20.4599(10) Å, β=104.239(4)°, V=9380.8(9) Å$^3$, Z=4, T=100.01 K, µ(CuKα)=1.594 mm$^{-1}$, D$_{calc}$=1.314 g/mm$^3$, 49019 reflections measured (2.898≤2Θ≤130.472), 15796 unique (R$_{int}$=0.0379, R$_{sigma}$=0.0422) which were used in all calculations. The final R$_1$ was 0.00925 (I>2σ(I)) and wR$_2$ was 0.2865 (all data).

c) Refinement Details. Distance restraints were imposed on the disordered PF$_6^-$ anions. The enhanced rigid-bond restraint (SHELX keyword RIGU) was applied on the disordered anions.[4] The solvent masking procedure as implemented in Olex2 was used to remove the electronic contribution of heavily disordered solvent molecules from the refinement. As the exact solvent content is not known, only the atoms used in the refinement model are reported in the formula here. Total solvent accessible volume/cell=1575.4 Å$^3$ [16.8%] Total electron count/cell=377.8.

Transient Absorption Spectroscopy

The setup for transient absorption measurements has been described elsewhere[1]. Photoexcitation pulses (414 and 575 nm) were obtained through a beta barium borate (BBO) crystal crystal doubling the fundamental beam or through an optical parametric amplifier. The pulse power for photoexcitation was attenuated to ~1 µJ/pulse, using neutral density filters. The pump polarization was randomized employing a commercial depolarizer (DPU-25-A, Thorlabs, Inc.) to eliminate any orientation dynamics contributions from the experiment. All the spectra were collected on a commercial spectrometer (Ultrafast Systems, LLC Helios and EOS spectrometers, for fsTA and nsTA, respectively). All samples were stirred to avoid localized heating or degradation effects. The optical density was maintained around 0.5 for all samples.

Data Analysis for Time-Resolved Optical Spectroscopy

Prior to kinetic analysis, the transient absorption data are background/scatter-subtracted and chirp-corrected, and the visible and NIR data sets are spectrally merged (Surface Xplorer 4, Ultrafast Systems, LLC).

The kinetic analysis was based on a global fit to selected single-wavelength kinetics. The time-resolution is given as w=300 fs (full width at half maximum, FWHM); the assumption of a uniform instrument response across the frequency domain and a fixed time-zero (t0) are implicit in the global analysis.

The kinetic data from multiple different wavelengths are fitted using the global analysis described below. Each wavelength is given an initial amplitude that is representative of the spectral intensity at time t0, and varied independently to fit the data. The time/rate constants and t0 are shared between the various kinetic data and are varied globally across the kinetic data in order to fit the model(s) described below. We fit the dataset globally to a specified kinetic model and use the resultant populations to deconvolute the dataset and reconstruct species-associated spectra.

For ExBox4+⊃DPP at pH=7, we use the species-associated model $$\underline{K} = \begin{pmatrix} -k_{A \to B} & 0 \\ k_{A \to B} & 0 \end{pmatrix}$$

with A(0)=1 and B(0)=0.

For the low-pH experiment, the kinetics are more complicated owing to the distribution of host-guest binding in solution. We use a first-order kinetic model with rate matrix K:

$$\underline{K} = \begin{pmatrix} -k_{A \to B} & 0 & 0 & 0 \\ k_{A \to B} & -k_{B \to GS} & 0 & 0 \\ 0 & 0 & -k_{C \to D} & 0 \\ 0 & 0 & k_{C \to D} & 0 \end{pmatrix}$$

with A(0)=1; B(0)=0, C(1)=0, and D(0)=0.

The differential equations were numerically solved through matrix methods, then convolutes the solutions with a Gaussian instrument response function with width w (FWHM), before employing a least-squares fitting routine using a Levenberg-Marquardt or Simplex method to find the parameters which result in matches to the kinetic data.

Once the fit parameters are established, they are fed directly into the differential equations, which were solved for the populations of the states in the model—i.e., A(t), B(t), C(t), and D(t). Finally, the raw data matrix (with all the raw data) is deconvoluted with the populations as functions of time to produce the spectra associated with each species.

Cell Culture

A2780 cells (human ovarian cancer cell line) and MCF-7 cells (human breast adenocarcinoma cell line) obtained from Sigma-Aldrich and American Type Culture Collection (ATCC, Rockville, MD, USA), respectively were utilized for cell culture experiments. These cells were cultured in Dulbecco's Modified Eagle's Medium (DMEM) supplemented with 10% fetal bovine serum (FBS), penicillin (100 IU/mL) and streptomycin (100 µg/mL) at 37° C. in the presence of air (95%) and $CO_2$ (5%).

MTT Assay

A2780 or MCF-7 cells ($2 \times 10^5$ cells/mL, 100 µL) were seeded in each well of a black 96-well plate. Stock solution of ExBox$^{4+}$⊃DPP in PBS (1 mM, 10 µL) was added to each well to achieve working concentrations and incubated for 12 h. After incubation, wells were washed with PBS, added with 100 µL of DMEM and immediately irradiated with visible light using Max-303 Xenon Light Source (385-740 nm, Asahi Spectra) at different light intensities (5-50 mW) for 1 to 15 min. Following irradiation, cells were incubated overnight and then added with MTT (5 mg/mL in PBS, 10 µL). After 4 h incubation with MTT, media from each well was pipetted out, formazan crystals deposited on the plate were dissolved in 200 µL of $Me_2SO$, and the absorbance of each well was measured using a microplate reader at 560 nm. All the samples were analyzed in quadruplicates.

The percentage cell viability was calculated using the following formula: % cell viability=(OD of treated sample/OD of untreated sample)*100.

Live Cell Confocal Microscopy

A2780 cells ($1 \times 10^5$ cells/mL, 300 µL) were plated in each well of an 8-well µ-slide (ibidi cell focus) and cultured overnight. PBS solution of ExBox$^{4+}$⊃DPP was added to each well and incubated for predetermined time points. For cellular co-localization studies, cells were washed with phenol free DMEM and stained with LysoTracker green (lysosome stain, 1:1000 dilution) or MitoSpy™ Green FM (mitochondria stain, 1:2000 dilution) or NucBlue™ Live ReadyProbes™ Reagent (nuclei stain, 1 drop). For the live-dead assay, cells were incubated with PBS solution of ExBox$^{4+}$⊃DPP irradiated for 10 min at 25 or 50 MW light intensity, incubated overnight, and stained with Calcein AM (2 µM) and Ethidium homodimer-1 (4 µM). Plated cells were imaged within a humidified chamber using a 63× oil-immersion objective on a SP5 Leica Confocal Microscope using HyD detectors and lasers.

Intracellular ROS Generation

Intracellular ROS generation assay was performed using DCFDA Cellular ROS Detection Assay Kit (Abeam), according to the manufacturer's instructions. Briefly, A2780 cells ($2.5 \times 10^5$ cells/mL, 100 µL) were seeded in each well of a black 96-well plate and incubated with PBS solution of ExBox$^{4+}$⊃DPP for 12 h. After incubation, cells were washed with PBS and incubated with 2',7'-dichlorofluorescin diacetate (DCFDA) (20 µM) for 45 min in the dark. Then the cells were rinsed with PBS, irradiated and fluorescence was measured ($\lambda_{ex}$=485 and $\lambda_{em}$=535 nm) using a microplate reader. Control experiments with PBS solution of ExBox$^{4+}$⊃DPP treated cells and untreated cells, both with and without irradiation were performed.

Cellular Uptake Studies

A2780 cells ($5 \times 10^5$ cells/mL, 200 µL) were seeded in each well of a 48-well plate and treated with 10 µM PBS solution of ExBox$^{4+}$⊃DPP for 30 min, 1 h, 2 h, 6 h, and 12 h. Cells were washed with PBS, trypsinized, and incubated with 50 µL of 1:100 Zombie Aqua fixable cell viability dye for 15 min at 4° C. After incubation, cells were washed with 600 µL PBS, spun at 400 ref for 5 min, and the supernatant was discarded. Cells were then suspended in 100 µL of 2% paraformaldehyde prior to being analyzed using a BD Fortessa flow cytometer. Cells were first gated for singlet events using FSC-A vs. FSC-H, after which debris was excluded used FSC-A vs. SSC-A. Cells gated as Zombie Aqua low were considered live cells, which were then analyzed for their median fluorescence intensity (MFI) in the PE-Cy5 channel for ExBox$^{4+}$⊃DPP fluorescence, representing the amount of ExBox$^{4+}$⊃DPP taken up by each cell.

Apoptosis Assay

A2780 cells ($5 \times 10^5$ cells/mL, 100 µL) were seeded in each well of a Black 96-well plate and incubated with 5 or 10 µM PBS solution of ExBox$^{4+}$⊃DPP for 12 h. After incubation, cells were washed with 1×PBS, added with 100 µL of DMEM and immediately irradiated with visible light using Max-303 Xenon Light Source (385-740 nm, Asahi Spectra) at 25 and 50 mW light intensities for 10 min. After irradiation, cells were incubated for an additional 3 h prior to being trypsinized and recovered for annexin V staining. 50 µL of Annexin V solution (1:50 FITC Annexin V in Annexin V staining buffer) was added to cells and was incubated at room temperature for 20 min. 500 µL of 1×PBS was then added to cells, which were centrifuged at 400 ref for 5 min, and the supernatant was discarded. Cells were resuspended in 100 µL of 1:20 7-AAD in cell staining buffer and were incubated for 10 min prior to analysis on a BD Fortessa flow cytometer. Cells were first gated for singlet events using FSC-A vs. FSC-H, after which debris was excluded used FSC-A vs. SSC-A. All remaining events were gated as live, dead, or apoptotic based on annexin V staining vs. 7-AAD staining, with dead cells staining 7-AAD+, live cells staining as 7-AAD- and annexin-V-, and apoptotic cells staining 7-AAD-annexin-V+. Cells without irradiation were used as controls.

Detection of Singlet Oxygen

Singlet oxygen ($^1O_2$) quantum-yield measurements were conducted by a chemical method. The disodium salt of 9.10-anthracenedipropionic acid (ADPA) was used as singlet oxygen detection reagent with methylene blue used as a reference ($\Phi_r$=0.53). In this experiment, ADPA (0.1 μmol) was added to the $H_2O$ solution of ExBox$^{4+}$ ⊃ DPP (20 μM) with a laser irradiation (630 nm, 50 mW) for 20 min, followed by quantification of $^1O_2$ by the absorbance intensity change (UV-3600 Shimadzu spectrophotometer) at 380 nm of ADPA. The calculation of $^1O_2$ quantum yield is based on the equality $\Phi\Delta=(\Delta A_s/\Delta A_r)\Phi_r$. $\Delta A_s$ is the absorption change of detected photosensitizer, $\Delta A_r$ is the absorption change of referenced photosensitizer and $\Phi^r$ is the quantum yield of singlet oxygen of referenced photosensitizer (methylene blue). No change of absorption ($\Delta A_s \sim 0$) confirmed that $^1O_2$ was not generated during the experiment.

ADPA (0.1 μmol) was added to the $H_2O$ solution of DPPH$_2^+$ (20 μM) with a laser irradiation (630 nm, 50 mW) for 20 min, followed by quantification of the $^1O_2$ by the absorbance intensity change (UV-3600 Shimadzu spectrophotometer) at 380 nm of ADPA. The calculation of the $^1O_2$ quantum yield is based on the equality $\Phi\Delta=(\Delta A_s/\Delta A_r)\Phi_r$ where $\Delta A_s$ is the absorption change of detected photosensitizer, $\Delta A_r$ is the absorption change of referenced photosensitizer and $\Phi_r$ is the quantum yield of singlet oxygen of referenced photosensitizer (methylene blue). Measured $^1O_2$ quantum yield of DPPH$_2^{2+}$ is 0.38 in $H_2O$.

ADPA (0.1 μmol) was added to the acetone solution of DPP (20 μM) with a laser irradiation (630 nm, 50 mW) for 20 min, followed by quantification of the $^1O_2$ by the absorbance intensity change (UV-3600 Shimadzu spectrophotometer) at 380 nm of ADPA. The calculation of the $^1O_2$ quantum yield is based on the equality $\Phi\Delta=(\Delta A_s/\Delta A_r)\Phi_r$ where $\Delta A_s$ is the absorption change of detected photosensitizer, $\Delta A_r$ is the absorption change of referenced photosensitizer and $\Phi_r$ is the quantum yield of singlet oxygen of referenced photosensitizer (methylene blue). Measured $^1O_2$ quantum yield of DPP is 0.43 in acetone.

REFERENCES

1. Pascal, A. A., Liu, Z., Broess, K., Van Oort, B., Van Amerongen, H., Wang, C., Horton, P., Robert, B., Chang, W. & Ruban, A. Molecular basis of photoprotection and control of photosynthetic light-harvesting. *Nature* 436, 134-137 (2005).
2. Ballottari, M., Mozzo, M., Girardon, J., Hienerwadel, R. & Bassi, R. Chlorophyll triplet quenching and photoprotection in the higher plant monomeric antenna protein Lhcb5. *J. Phys. Chem. B* 117, 11337-11348 (2013).
3. Peers, G., Truong, T. B., Ostendorf, E., Busch, A., Elrad, D., Grossman, A. R., Hippler, M. & Niyogi, K. K. An ancient light-harvesting protein is critical for the regulation of algal photosynthesis. *Nature* 462, 518-521 (2009).
4. Ruban, A. V., Berera, R., Ilioaia, C., Van Stokkum, I. H. M., Kennis, J. T. M., Pascal, A. A., Van Amerongen, H., Robert, B., Horton, P. & Van Grondelle, R. Identification of a mechanism of photoprotective energy dissipation in higher plants. *Nature* 450, 575-578 (2007).
5. Tokutsu, R. & Minagawa, J. Energy-dissipative supercomplex of photosystem II associated with LHCSR3 in *Chlamydomonas reinhardtii*. *Proc. Natl. Acad. Sci. USA*. 110, 10016-10021 (2013).
6. Ruban, A. V. Nonphotochemical chlorophyll fluorescence quenching: mechanism and effectiveness in protecting plants from photodamage. *Plant Physiol.* 104, 1903-1916 (2016).
7. Gust, G. & Moore, T. A. Mimicking photosynthesis. *Structure* 244, 35-41 (1989).
8. Cazzaniga, S., Bressan, M., Carbonera, D., Agostini, A. & Dall'osto, L. Differential roles of carotenes and xanthophylls in photosystem photoprotection. *Biochemistry* 55, 3636-3649 (2016).
9. Freer, A., Prince, S., Sauer, K., Papiz, M., Lawless, A. H., McDermott, G., Cogdell, R. & Isaacs, N. W. Pigment-pigment interactions and energy transfer in the antenna complex of the photosynthetic bacterium *Rhodopseudomonas acidophila*. *Science* 4, 449-462 (1996).
10. Chen, L., Bai, H., Xu, J. F., Wang, S. & Zhang, X. Supramolecular porphyrin photosensitizers: controllable disguise and photoinduced activation of antibacterial behavior. *ACS Appl. Mater. Interfaces* 9, 13950-13957 (2017).
11. Liu, K., Liu, Y., Yao, Y., Yuan, H. Wang, S., Wang, Z. & Zhang, X. Supramolecular photosensitizers with enhanced antibacterial efficiency. *Angew. Chem. Int. Ed.* 52, 8285-8289 (2013).
12. Wang, X. Q., Lei, Q., Zhu, J. Y., Wang, W. J., Cheng, Q., Gao, F., Sun, Y. X. & Zhang, X. Z. Cucurbit[8]uril regulated activatable supramolecular photosensitizer for targeted cancer imaging and photodynamic therapy. *ACS Appl. Mater. Interfaces* 8, 22892-22899 (2016).
13. Schmitt, F., Freudenreich, J., Barry, N. P. E., Jeanneret, L. J., Fink, G. S. & Therrien, B. Organometallic cages as vehicles for intracellular release of photosensitizers. *J. Am. Chem. Soc.* 134, 754-757 (2012).
14. Li, X., Lee, S. & Yoon, J. Supramolecular photosensitizers rejuvenate photodynamic therapy. *Chem. Soc. Rev.* 47, 1174-1188 (2018).
15. Roy, I., Shetty, D., Hota, R., Baek, K., Kim, J., Kim, C., Kappert, S. & Kim, K. A multifunctional subphthalocyanine nanosphere for targeting, labeling, and killing of antibiotic-resistant bacteria. *Angew. Chem. Int. Ed.* 54, 15152-15155 (2015).
16. Francés-Soriano, L., Zakharko, M. A., González-Béjar, M., Panchenko, P. A., Herranz-Pérez, V., Pritmov, D. A., Grin, M. A., Mironov, A. F., Garcia-Verdugo, J. M., Fedorova, O. A. & Pérez-Prieto, J. Nanohybrid for photodynamic therapy and fluorescence imaging tracking without therapy. *Chem. Mater.* 30, 3677-3682 (2018).
17. Barnes, J. C., Juriček, M., Strutt, N. L., Frasconi, M., Sampath, S., Giesener, M. A., McGrier, P. L., Bruns, C. J., Stern, C. L. Sarjeant, A. A. & Stoddart, J. F. ExBox: A polycyclic aromatic hydrocarbon scavenger. *J. Am. Chem. Soc.* 135, 183-192 (2013).
18. Young, R. M., Jensen, S. C., Edme, K., Wu, Y., Krzyaniak, M. D., Vermeulen, N. A., Dale, E. J., Stoddart, J. F. Weiss, E. A., Wasielewski, M. R. & Co, D. T. Ultrafast two-electron transfer in a CdS quantum dot-extended-viologen cyclophane complex. *J. Am. Chem. Soc.* 138, 6163-6170 (2016).
19. Young, R. M., Dyar, S. M., Barnes, J. C., Juriček, M. Stoddart, J. F. Co, D. T., Wasielewski, M. R. Ultrafast conformational dynamics of electron transfer in ExBox$^{4+}$ ⊃ Perylene. *J. Phys. Chem. A* 117, 12438-12448 (2013).
20. Roy, I., Bobbala, S., Zhou, J., Nguyen, M. T., Nalluri, S. K. M., Wu, Y., Ferris, D. P., Scott, E. A., Wasielewski, M. R. & Stoddart, J. F. ExTzBox: A glowing cyclophane for live-cell imaging. *J. Am. Chem. Soc.* 140, 7206-7212 (2018).

21. Berg, K., Selbo, P. K., Weyergang, A., Dietze, A., Prasmickaite, L., Bonsted, A., Engesaeter, B, Ø, Angell-Petersen, E., Warloe, T., Frandsen, N., Høgset, A. Porphyrin-related photosensitizers for cancer imaging and therapeutic applications. *J. Microsc.* 218, 133-147 (2005).
22. Jeong, H. G. & Choi, M. S. Design and properties of porphyrin-based singlet oxygen generator. *Isr. J. Chem.* 56, 110-118 (2016).
23. Wang, J., Zhong, Y., Wang, X., Yang, W., Bai, F., Zhang, B., Alarid, L., Bian, K. & Fan, H. pH-Dependent assembly of porphyrin-silica nanocomposites and their application in targeted photodynamic therapy. *Nano Lett.* 17, 6916-6921 (2017).
24. Yin, Y. B. DFT study on deprotonation and protonation of porphyrins: How many protons can the porphyrin core take up? *Comput. Theor. Chem.* 1080, 38-46 (2016).
25. Presselt, M., Dehaen, W., Maes, W., Klamt, A., Martinez, T., Beenken, W. J. D. & Kruk, M. Quantum chemical insights into the dependence of porphyrin basicity on the meso-aryl substituents: Thermodynamics, buckling, reaction sites and molecular flexibility. *Phys. Chem. Chem. Phys.* 17, 14096-14106 (2015).
26. Chen, D. M., Liu, X., He, T. J. & Liu, F. C. Density functional theory investigation of porphyrin diacid: Electronic absorption spectrum and conformational inversion. *Chem. Phys.* 289, 397-407 (2003).
27. Fukuzumi, S., Honda, T. & Kojima, T. Structures and photoinduced electron transfer of protonated complexes of porphyrins and metallophthalocyanines. *Coord. Chem. Rev.* 256, 2488-2502 (2012).
28. Hu, Y. B., Dammer, E. B., Ren, R. J. & Wang, G. The endosomal-lysosomal system: From acidification and cargo sorting to neurodegeneration. *Transl. Neurodegener.* 4, 1-10 (2015).
30. Cui, H. & Xu, B. Supramolecular medicine. *Chem. Soc. Rev.* 46, 6430-6432 (2017).
31. Abrahamse, H.& Hamblin, M. R, New photosensitizers for photodynamic therapy. *Biochem J.* 473(4), 347-364 (2016).

We claim:

1. A pharmaceutical composition comprising water-soluble host-guest complex formed from a host receptor and a guest photosensitizer,
   wherein the photosensitizer comprises a macrocyclic pyrrole,
   wherein the receptor host is a cyclophane, and
   one or more pharmaceutically acceptable carriers, excipients, or diluents,
   wherein the pharmaceutical composition comprises an effective amount of the guest photosensitizer for treating a cell proliferative disease or disorder.

2. The pharmaceutical composition of claim 1, wherein the cell proliferative disease or disorder is a cancer.

3. The pharmaceutical composition of claim 1, wherein the cell proliferative disease or disorder is a microbial infection.

4. The pharmaceutical composition of claim 1, wherein the macrocylic pyrrole is a porphyrin, a chlorin, a bacteriochlorin, a phthalocyanine, a napthalocyanine, or a subphthalocyanine.

5. The pharmaceutical composition of claim 1, wherein the cyclophane comprises two extended viologen units and two linker units having an ordered, cyclic arrangement alternating between extended viologen unit and linker unit.

6. The pharmaceutical composition of claim 1, wherein the host receptor comprises

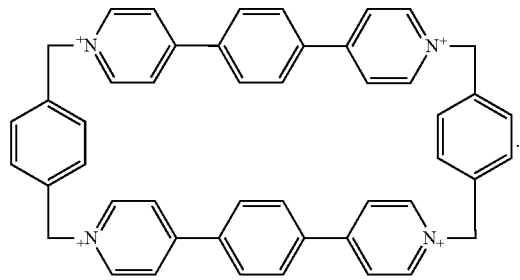 [SMILES: c1cc2ccc1C[n+]1ccc(cc1)-c1ccc(cc1)-c1cc[n+](cc1)Cc1ccc(cc1)C[n+]1ccc(cc1)-c1ccc(cc1)-c1cc[n+](cc1)C2]

* * * * *